Aug. 13, 1929.  W. E. WILLIAMS  1,724,242
MACHINE FOR MAKING COPIES ON THE HECTOGRAPH PRINCIPLE
Filed Sept. 5, 1925     15 Sheets-Sheet 1

Witness:
A. J. Sauser

Inventor:
William Erastus Williams

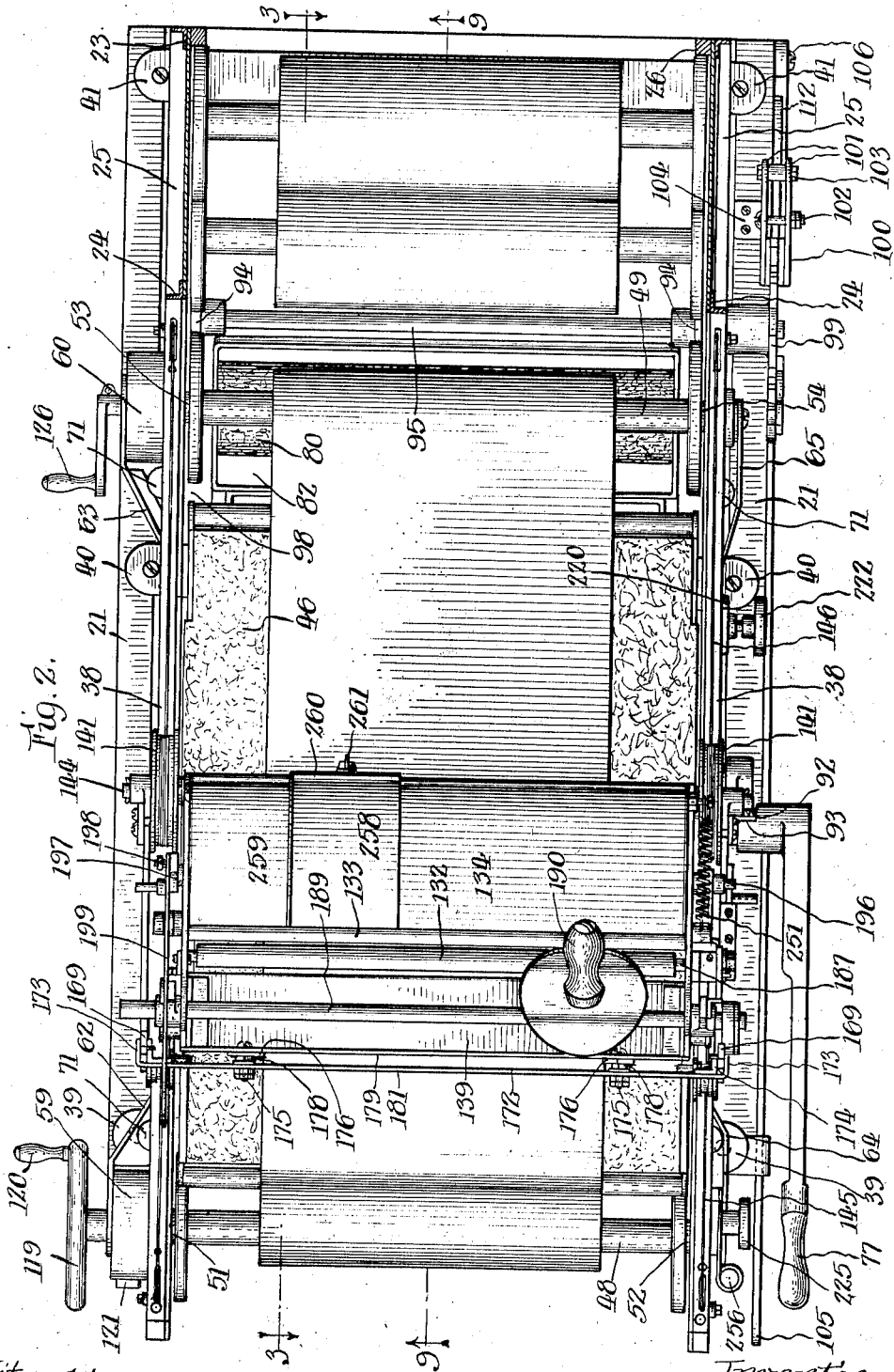

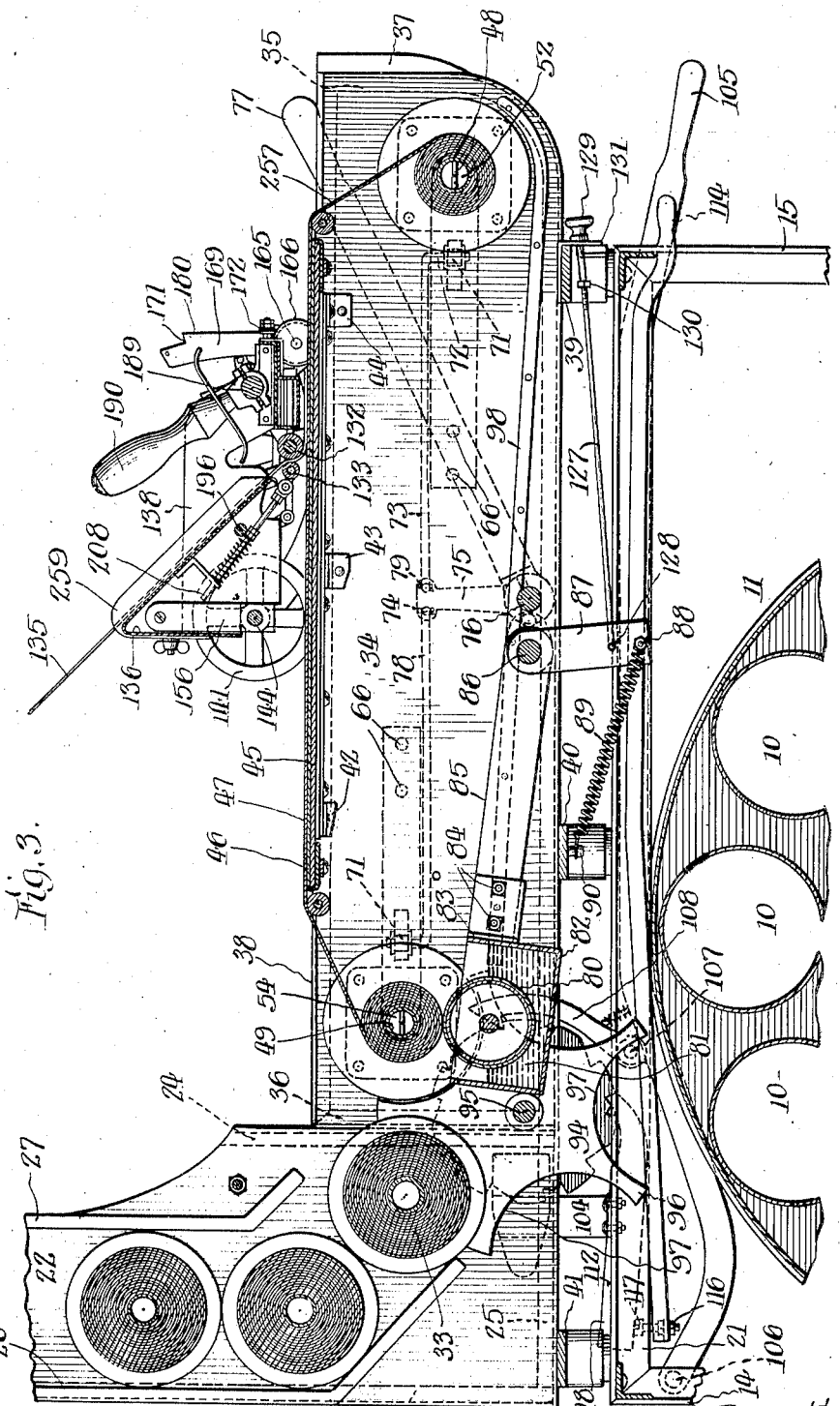

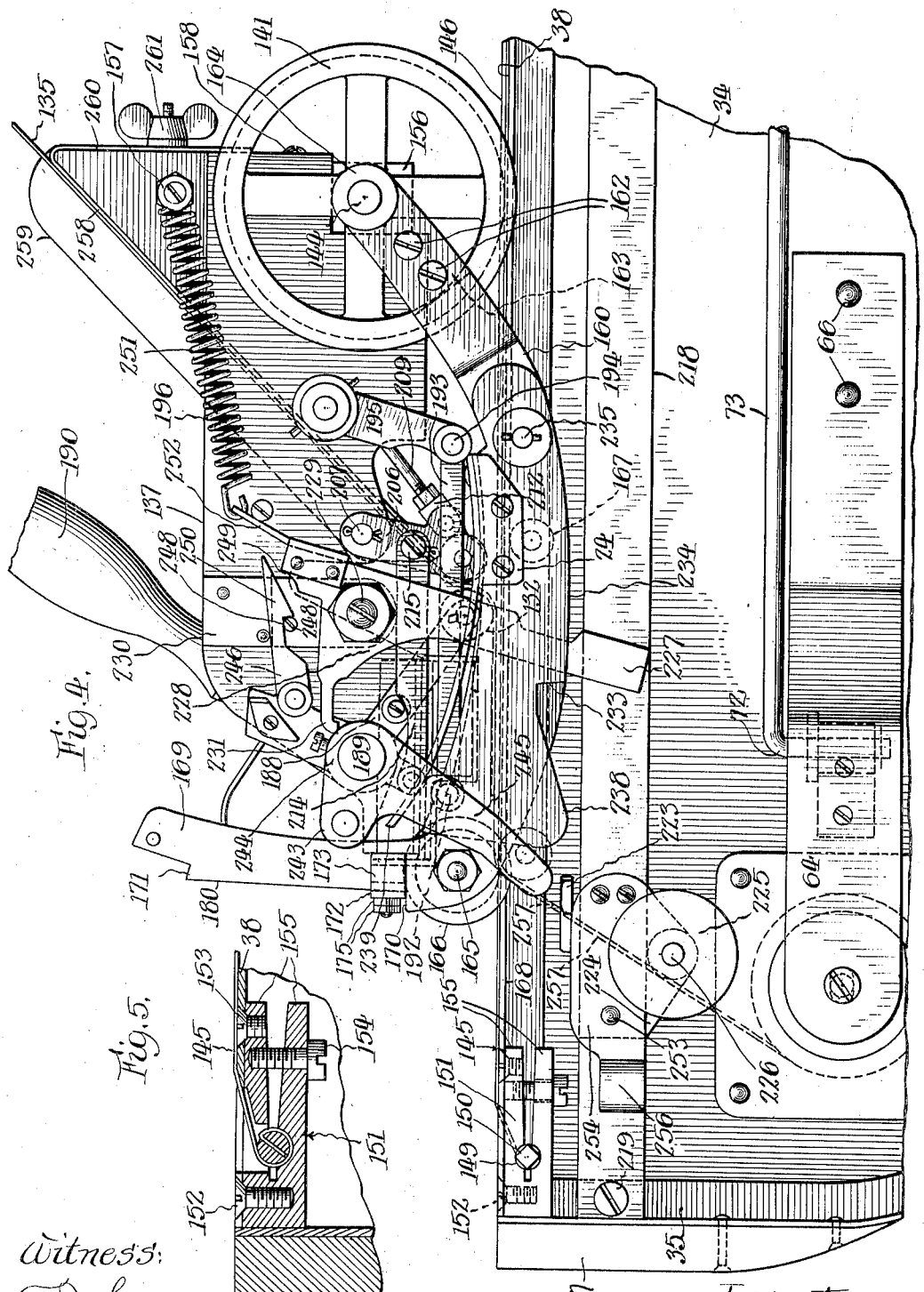

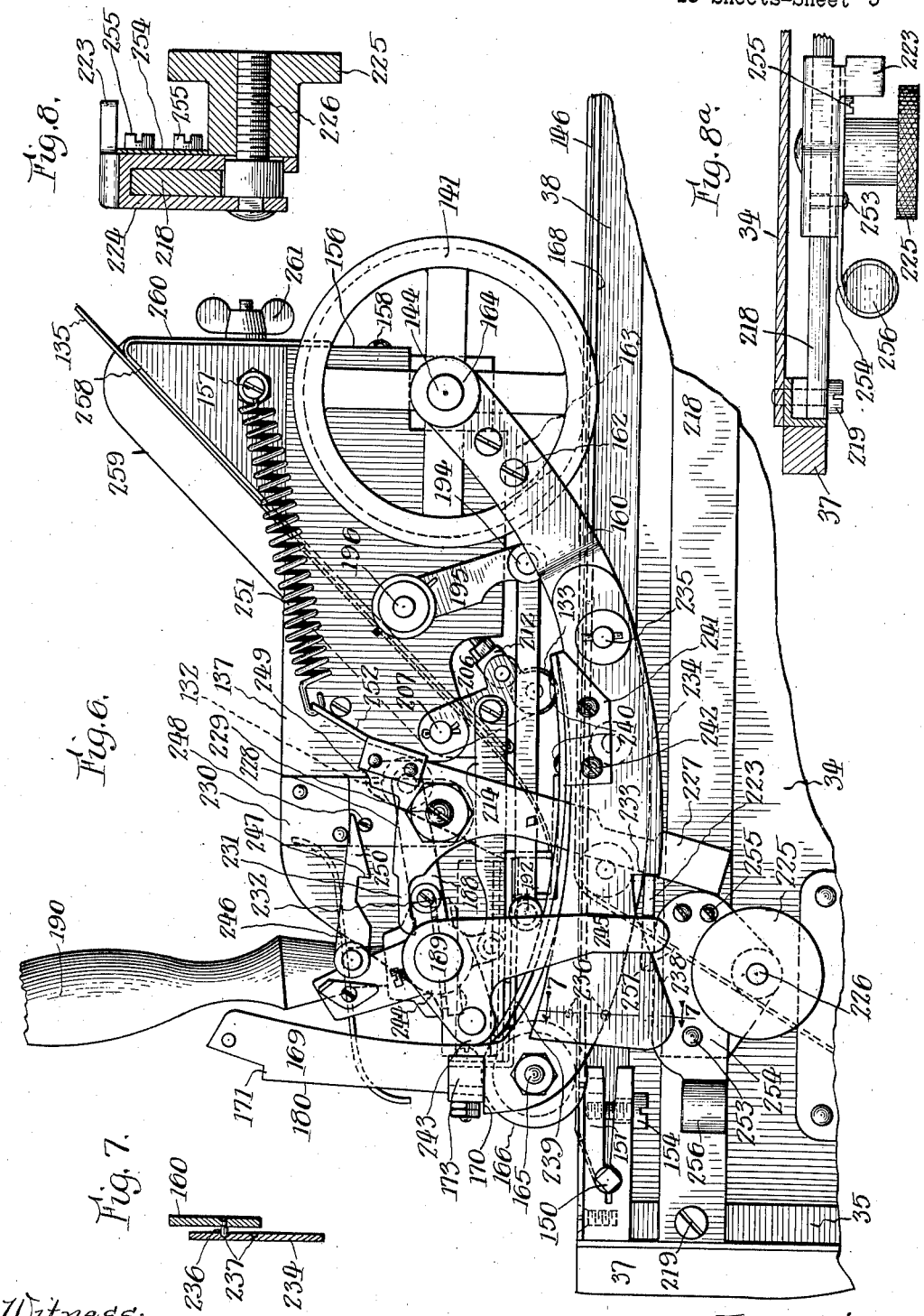

Aug. 13, 1929.  W. E. WILLIAMS  1,724,242
MACHINE FOR MAKING COPIES ON THE HECTOGRAPH PRINCIPLE
Filed Sept. 5, 1925  15 Sheets-Sheet 6

Witness:
A. J. Sauser.

Inventor:
William Erasmus Williams

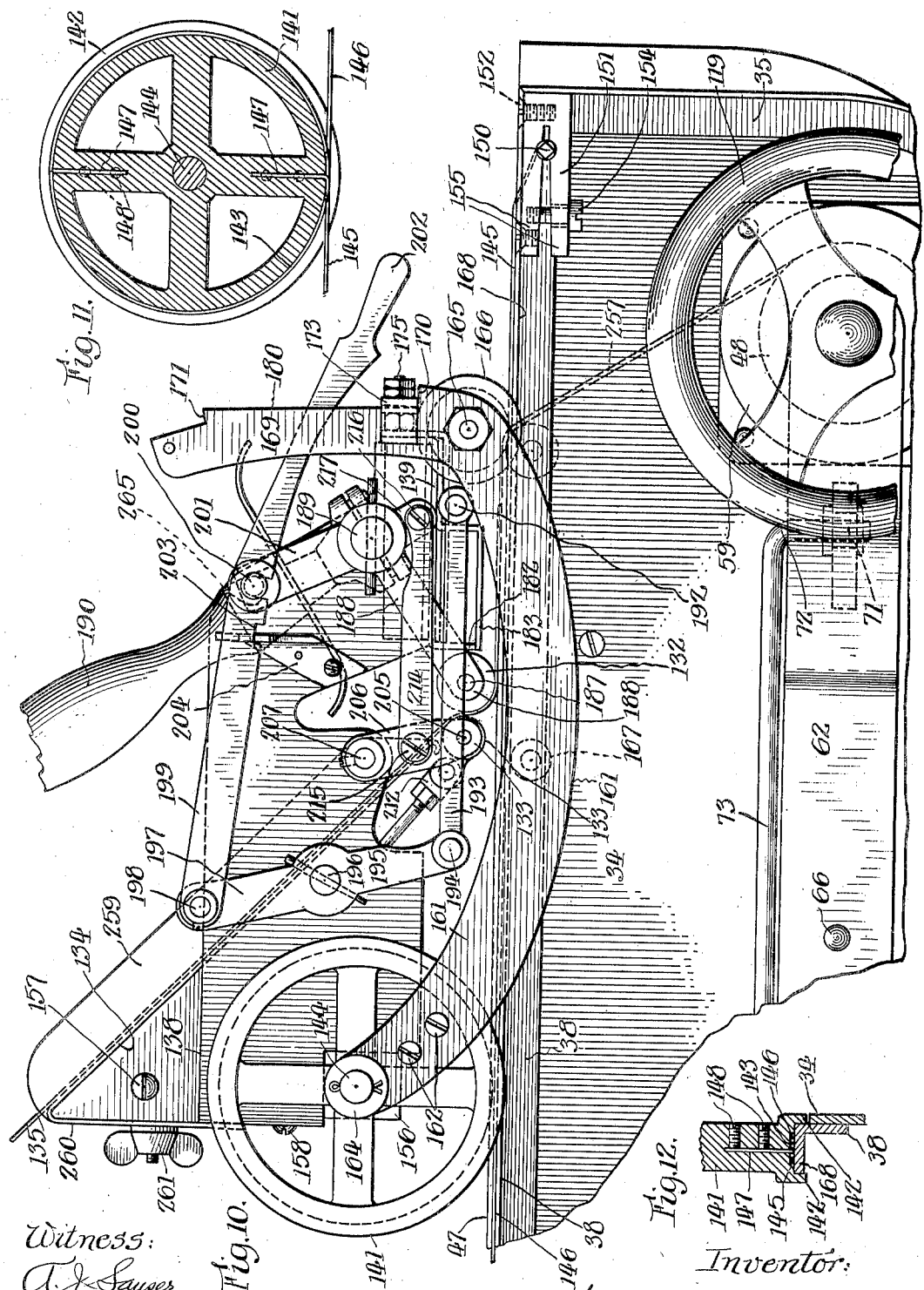

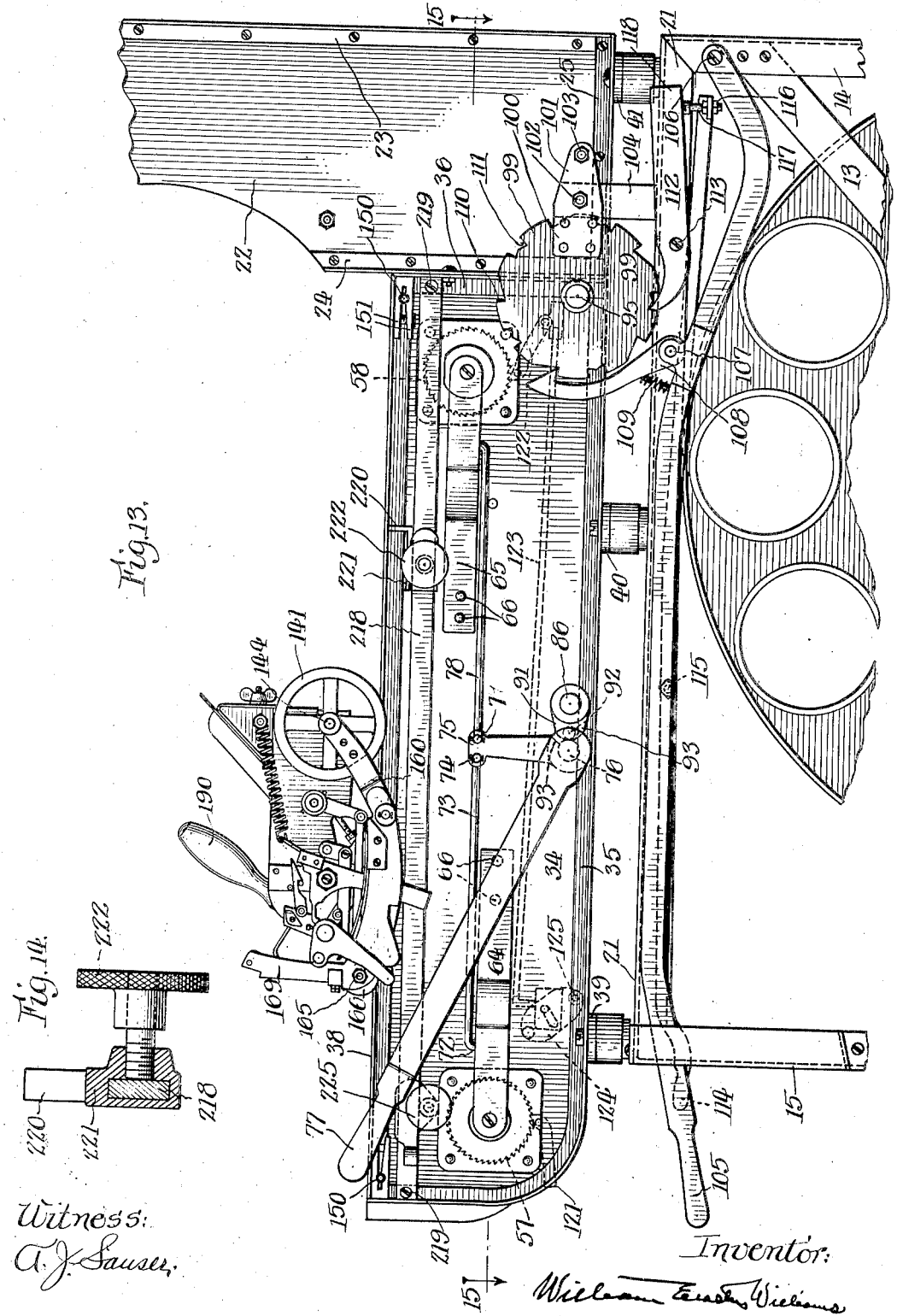

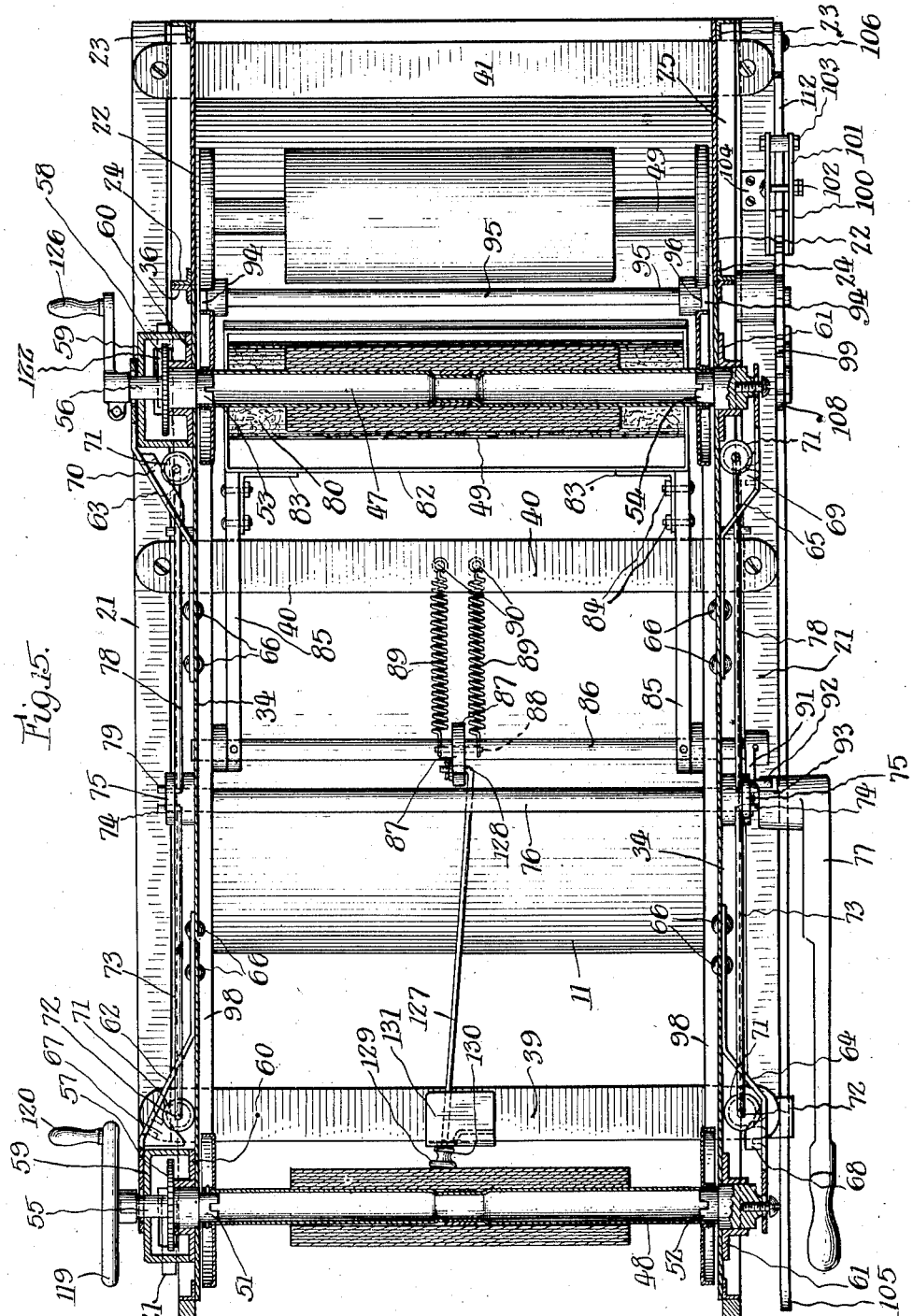

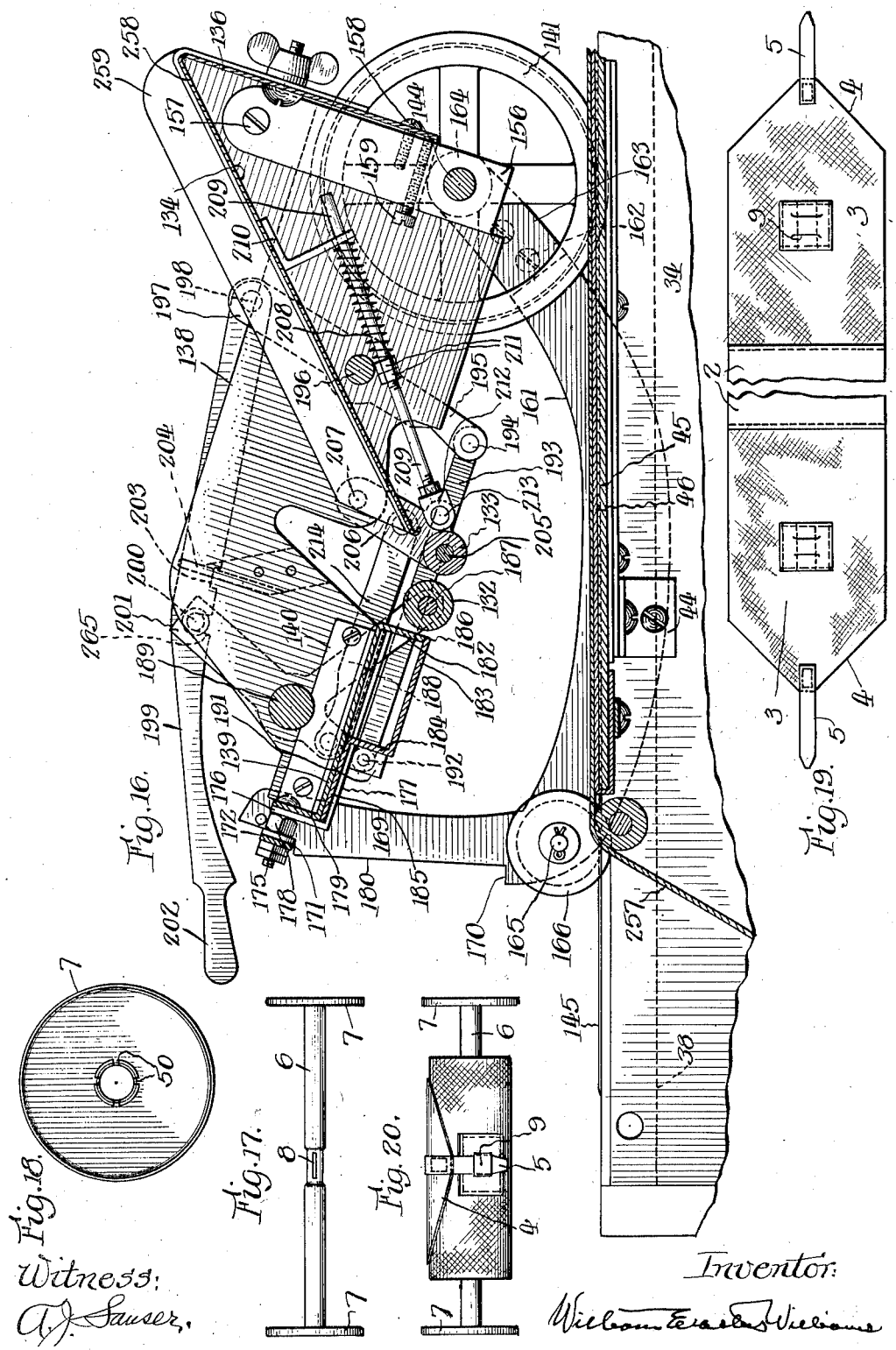

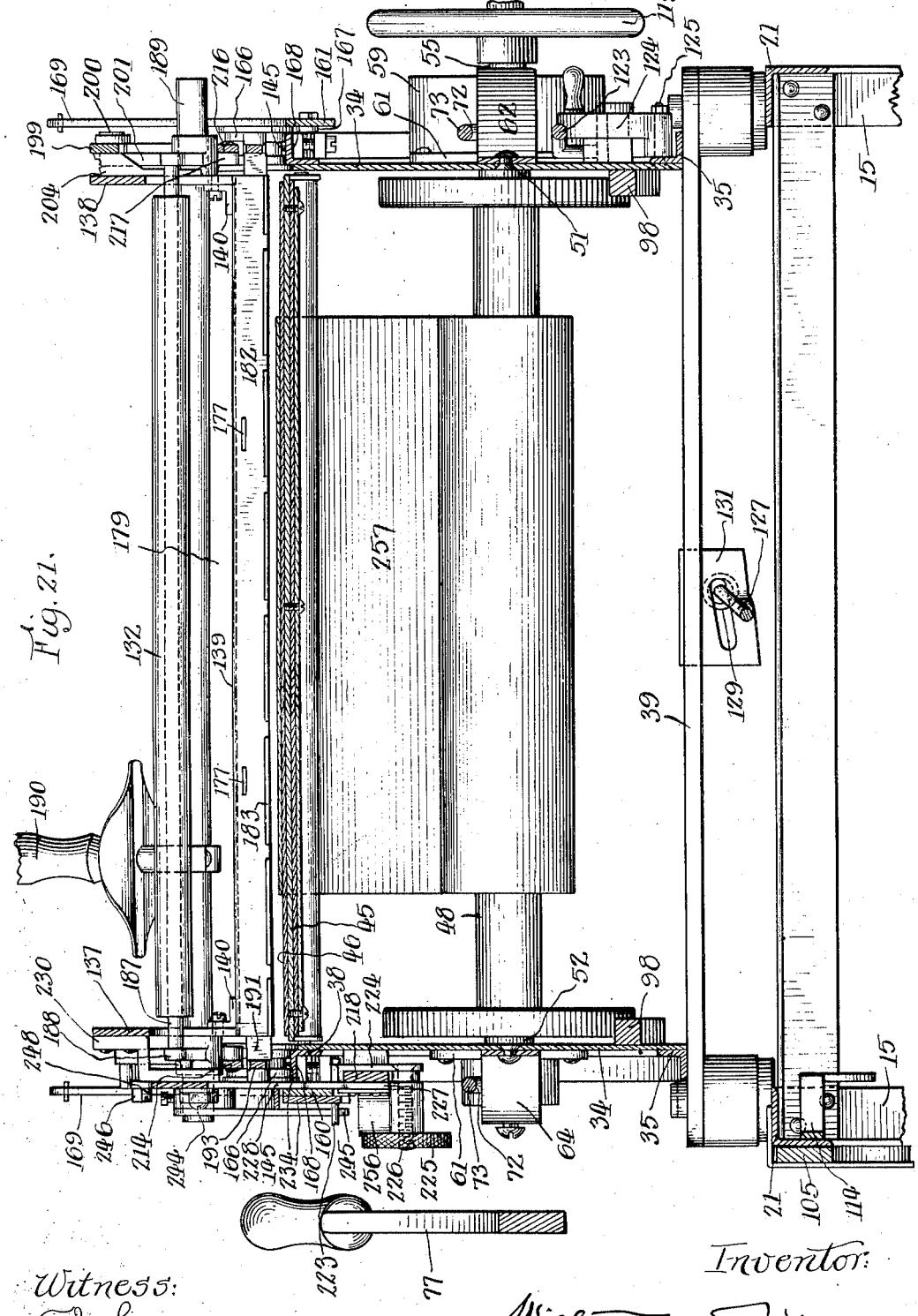

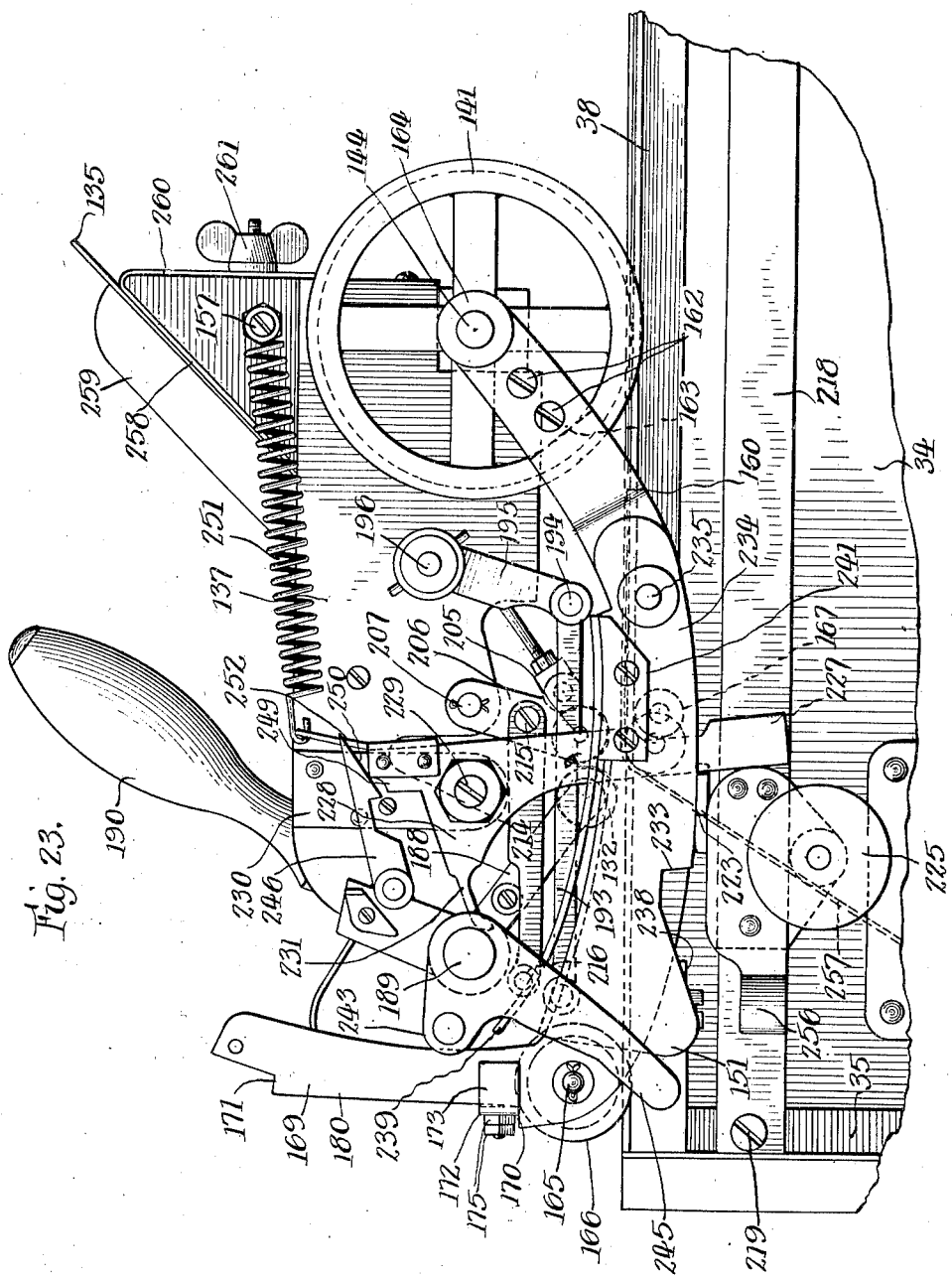

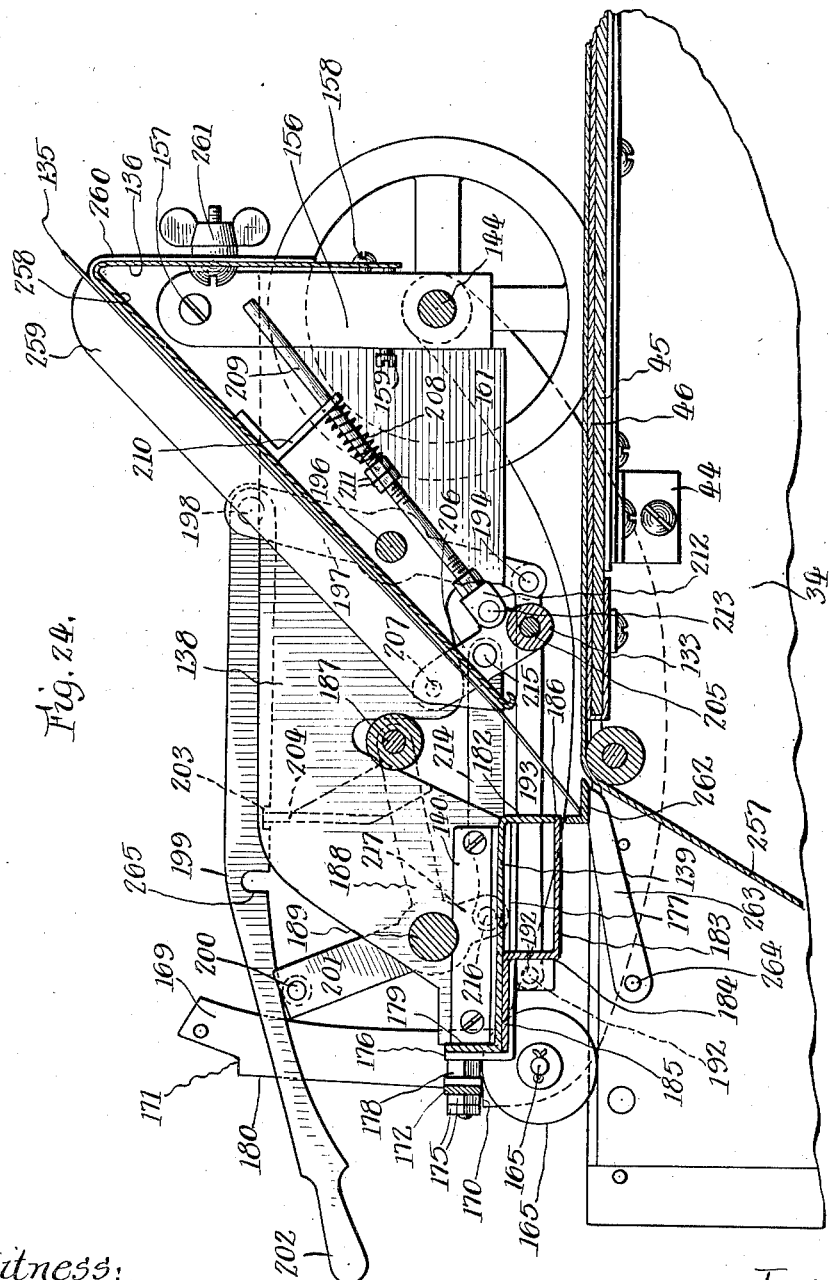

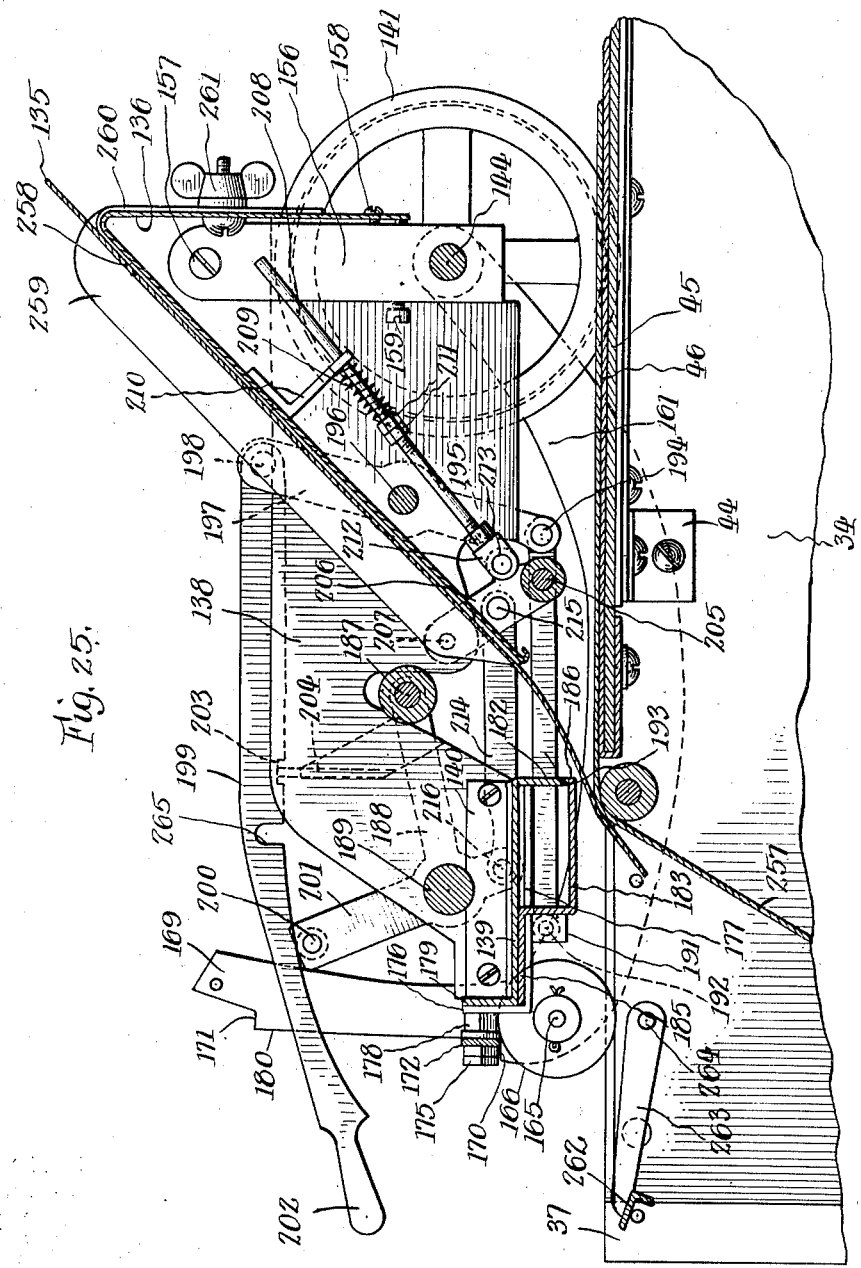

Patented Aug. 13, 1929.

1,724,242

UNITED STATES PATENT OFFICE.

WILLIAM ERASTUS WILLIAMS, OF WILMETTE, ILLINOIS, ASSIGNOR TO DITTO INCORPORATED, OF CHICAGO, ILLINOIS, A CORPORATION OF WEST VIRGINIA.

MACHINE FOR MAKING COPIES ON THE HECTOGRAPH PRINCIPLE.

Application filed September 5, 1925. Serial No. 54,750.

This machine relates to a type of machine wherein a gelatin pad strip is carried upon spindles mounted at each end of a bed and wound from one spindle over the top of the bed to and upon the other spindle as successive portions of the gelatin pad sheet are used in the work of copying.

The invention relates to special means of laying down the copy on the gelatin pad sheet and removing the same in order to accomplish an exact registration and at the same time a complete compression of the entire area desired to be copied and do this without damaging the soft gelatin pad by undue abrasion by the contact of the paper.

Further, the invention relates to a magazine for holding additional spindles carrying additional gelatin pad sheets that are used successively one after the other as each day's work temporarily exhausts a single pad sheet on any given spindle and the features involved in these magazine arrangements are special details of convenience of storing the spindles and delivering them to the position of use and also for storing the spindles of special type used occasionally instead of the general run of continuous service.

Reference will be had to the accompanying drawings in which Figure 1 is a right side elevation of the machine.

Figure 2 is a plan view on section 2—2 of Fig. 1 on a larger scale than Figure 1.

Figure 3 is a vertical sectional elevation through the bed of the machine and the impression carriage on line 3—3 of Fig. 2 looking from the left of the machine.

Figure 4 is an enlarged view from that of Fig. 3 showing the right side of the impression carriage in the same position as that shown in Fig. 3, which is at a stage where the paper has started to be impressed upon the gelatin pad sheet.

Figure 5 is a vertical section through one corner of the frame of the machine showing a detail fastening of the end of one of the guide wires.

Figure 6 is an elevation of the front end of the machine on the right side of the impression carriage, a similar view to that of Fig. 4 but with the carriage at its home position when the paper is inserted for the beginning of an operation.

Figure 7 is a detail of the detent devices of one of the registering latches shown in transverse section on line 7—7 of Fig. 6.

Figure 8 is a transverse elevational view through the registering or stop block which locates the position of the carriage at the time the paper is inserted to be operated upon.

Figure 8<sup>A</sup> is a plan of the registering or stop block shown in Fig. 8.

Figure 9:
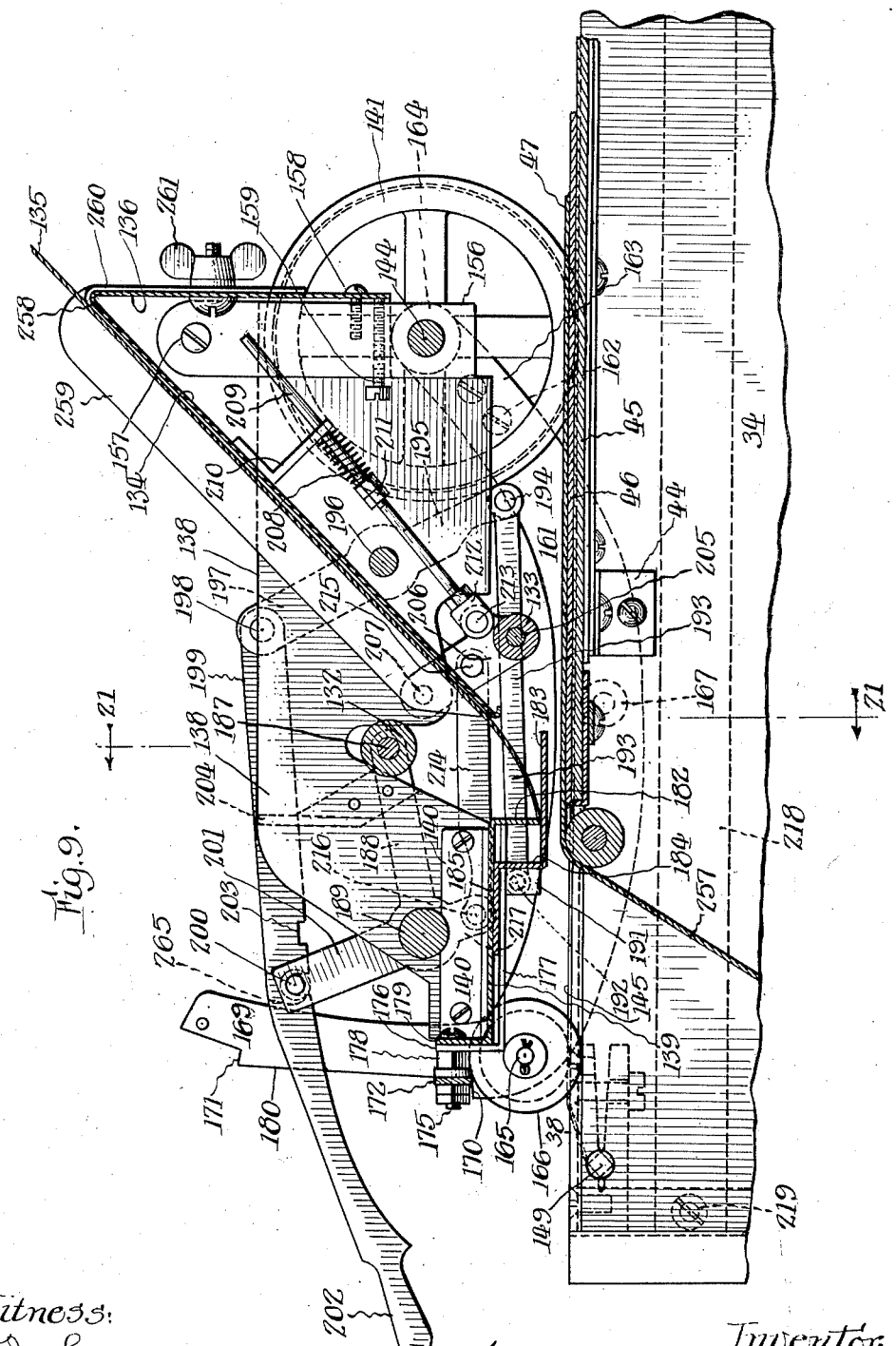

Figure 9 is a vertical sectional elevation on line 9—9 of Fig. 2, looking from the right side of the machine and shows the parts in the same position as that of Fig. 6.

Figure 10 is an elevation of the left end of the impression carriage in the same position as Fig. 4.

Figure 11 is a sectional elevation through the plane of the main carriage wheels.

Figure 12 is a transverse view through the tread of one of these wheels.

Figure 13 is an elevational view of the right side of the machine with parts omitted showing details of the spindle handling devices.

Figure 14 is a transverse elevational detail of the stroke stop for the carriage.

Figure 15 is a plan sectional view on line 15—15 of Fig. 13.

Figure 16 is an elevational sectional view transversely through the impression carriage looking from the right showing the carriage in a lifted position for the purpose of entering the web of the gelatin pad sheet to the front spindle.

Figure 17 is an elevation of one of the spools or spindles upon which the gelatin pad strip is carried.

Figure 18 is an end view of the spool or spindle shown in Fig. 17.

Figure 19 is a plan view of the gelatin pad strip used in the machine.

Figure 20 shows the spool or spindle with the gelatin pad strip or sheet rolled thereon.

Figure 21 is a transverse elevational section on line 21—21 of Fig. 9.

Figure 22:
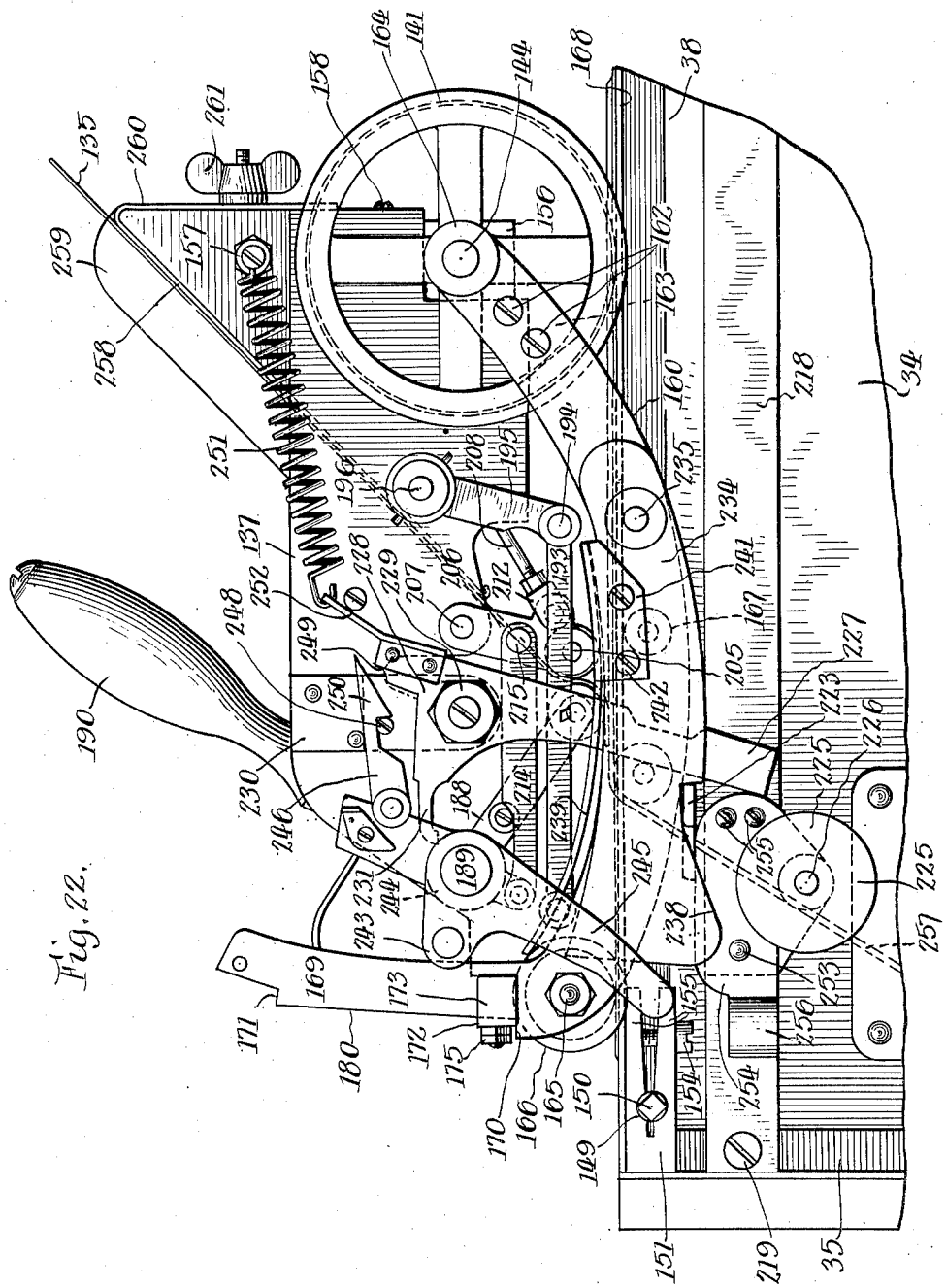

Figure 22 is a right side detail elevation showing the impression roller position at first contact with the paper before the carriage is moved forward in taking the impression.

Figure 23 is a similar view to that of Fig. 22 but with the impression carriage on its return movement to the full limit of the return showing the impression roller resting beyond the extreme end of the paper having passed over it on its return movement from the position of Fig. 22 after having gone over for the full stroke of the impression.

Figure 24 is a side elevation showing the position of impression roller when a paper stop is used that does not travel with the carriage over the impression bed.

Figure 25 is a section through the carriage and part of the bed when both paper stops are out of the way which permits the paper to be shoved through to any desired position and held by hand for purposes of registration.

In the drawing the hectograph material is in the form of a coated strip of paper or cloth having on its surface a thin mass of gelatinized material. This strip is indicated by 2 and best shown by Fig. 19, Sheet 10. On each end of this strip there is provided a cloth section 3 having tapered ends 4 terminating in small straps 5.

This gelatin pad sheet is wound onto the spindle or spool shaft 6, see Fig. 17, Sheet 10 having the end flanges 7 and one of the strap ends 5 of the gelatin pad sheet 2 is tucked into the slot 8 of the spindle 6 and as the spindle is wound the gelatin pad sheet is rolled thereon, the frictional contact of the strap end 5 in the slot 8 serving to start the winding.

On the completion of the winding of an entire gelatin pad sheet onto the spindle 6 the other strap end 5 is tucked into the keeper fold 9 of the cloth end section and thus the wound up gelatin pad sheet becomes, as it were, a unitary member with the spindle adapted to be supported and rolled along a chuteway on flanges 7 of the spindle 6 as indicated by Fig. 20, Sheet 10.

The gelatin pad sheet or strip is commonly called a roll in the commercial use of these sheets.

Figure 1:
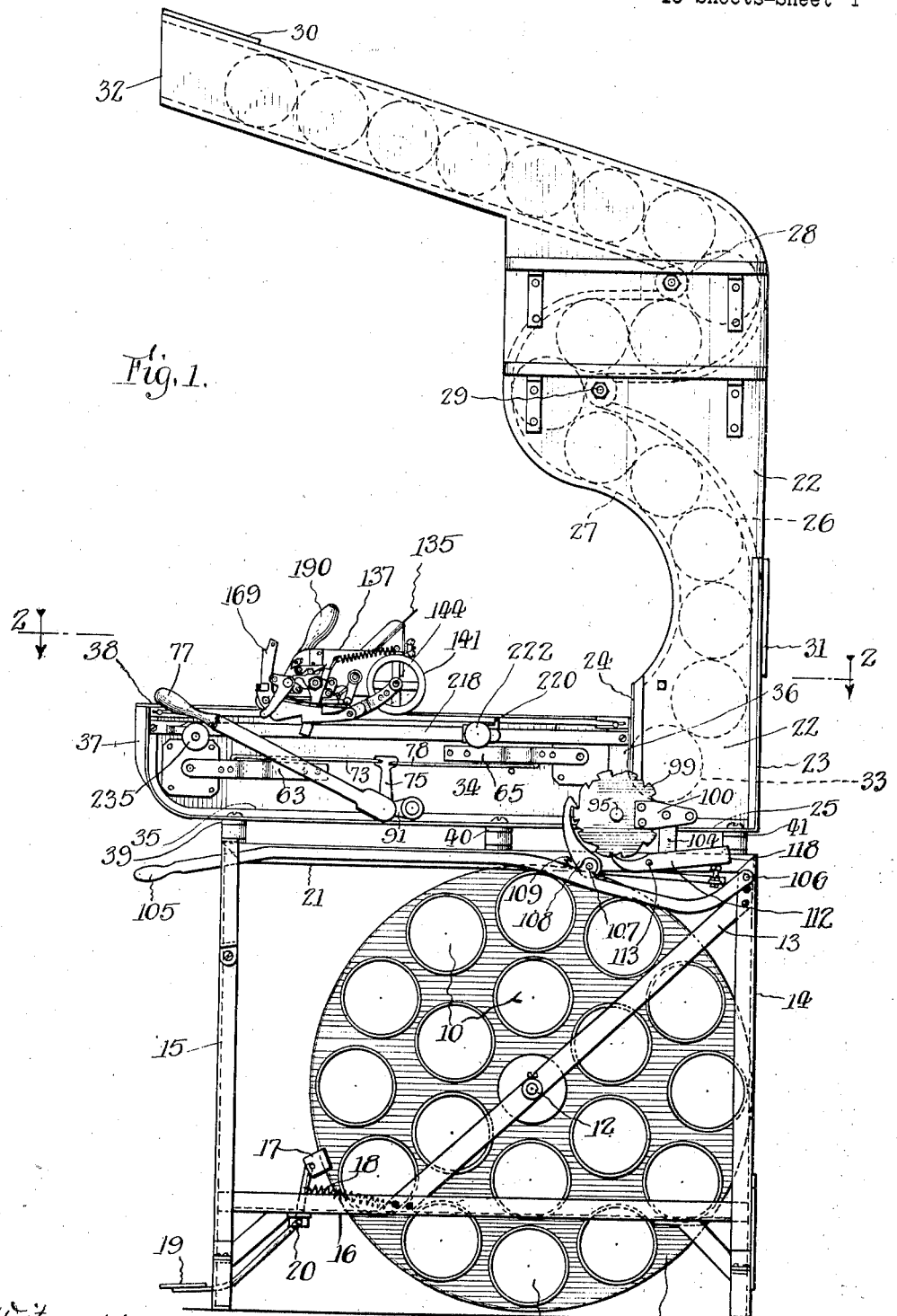

The machine is designed to carry a supply of these spindle rolls in a magazine chuteway connected directly to the machine in a manner that an operator may place a fresh spindle in an operative position with the least loss of time and effort possible, and this chuteway is shown at the top of the machine by Fig. 1 and is somewhat in the form of a letter S. This magazine chuteway at the top of the machine is intended to be used for carrying gelatin pad sheets of regular or more or less uniform type of a class of work that may be required of volume character, but in order to provide a suitable carrier for the storage of gelatin pads of greater width or of special character used occasionally or for a surplus stock of rolls of gelatin sheets or loaded spindles, I provide an additional magazine composed of a pocketed drum located underneath the machine in which there are cylindrical pockets into which the different spools or spindles of gelatin pad rolls may be placed and withdrawn endwise. These pockets are indicated by 10, Fig. 1, and the drum by 11, the drum having two end panels connected across to each other by the walls of the cylindrical pockets 10.

This drum 11 is mounted on a shaft 12 in a manner to revolve on the shaft as desired when the operator wishes to roll the drum around for convenient access to any given pocket 10 and the shaft 12 is mounted in diagonal members 13 of the frame which frame is provided with vertical posts 14 and 15 and the horizontal girders 16 and 21. A means for holding the drum stationary as desired is in the form of a brake 17 held in braking position by a spring 18 which holds the drum normally in any desired position and this brake 17 is controlled by a foot treadle 19 in reach of the operator and the treadle is hinged at 20 to one of the cross girder pieces 16.

Thus, as the operator desires, he may with his foot free the drum of the brake 17 and by hand revolve it to the desired pocket in which is stored the spindle he desires to use.

The magazine chuteway at the top of the machine is simply a chuteway having side plates 22 stiffened on the outside by the angle pieces 23 and 24 and a base cross angle piece 25 and on the inside of these plates 22 there are guideway chute ribs 26 and 27 which are of substantially the width of the tread portions of the flanges 7 of the spindles 6. These plates 22 are connected across by thimbles and bolts 28 and 29 and by a cap piece 30 at the top and a secondary cap or cross member 31 at the right side, see Fig. 1.

The operator as he uses an individual gelatin pad sheet commonly called a roll and exhausts its surface temporarily as is well known in the hectograph method of operation, places the exhausted roll with its spindle at the upper end 32 of the magazine at the top of the machine and it rolls down the chuteway by gravity to the position indicated by 33 ready to be moved into position of service as desired by the operator the spindles following each other by gravity down the chuteway.

The means or mechanism for taking a spindle from the chuteway and placing it in operative position in the machine is best illustrated by Fig. 3, Sheet 3, the spindle or roll in position next to be operated upon being indicated by 33, as above mentioned. That part of the machine which may be considered to be the operative part in the hectograph work is shown at the front of the machine at the left of Fig. 1 and at the right of Fig. 3 and is provided with the frame member pieces consisting of the side plates 34 stiffened on their edges by angle binding members 35 extending entirely around the margin of the side plates 34 and the rear vertical portions of this angle binding being indicated by 36 to which there is secured the corresponding binding member 24 of the upper magazine plates 22.

At the front of the machine secondary or small pieces 37 extend, as it were, the length of the plate frame members 34 extending a trackway 38 formed by the top portion of the angle iron binding 35. These side plates 34 are connected across at the bottom by cross bars 39, 40 and 41, 41 being under the S magazine proper.

On the inside of the plate frame pieces 34 there are small angle brackets 42, 43, and 44, Fig. 3, Sheet 3, which are secured to the plates 34 and to a bed plate member 45 over the top of which there is stretched a felt blanket 46. The felt covered plate 45 forms the impression bed upon which the gelatin pad sheet or roll is trained along and upon for the working area of any given portion of the gelatin pad sheet roll and this area is indicated by 47.

At the front of the machine on right of Fig. 3, Sheet 3, there is provided the spindle supporting or holding means that hold the front spindle indicated by 48 upon which is wound the gelatin pad as it is drawn over the impression bed and at the rear of the machine there is the spindle holding or supporting means for holding the spindle 49 which carries the gelatin pad portion which is withdrawn as required from the spindle 49 to the spindle 48 over the impression bed 45.

The means or mechanism which supports and controls the spindles 48 and 49 in the machine is best understood from Figs. 13 and 15, Sheets 8 and 9.

The spindles 6 being hollow tubes having open ends which ends are notched out as indicated by 50, see Fig. 18, Sheet 10, are held and supported in the machine by spindle plugs, the one at the front left of the machine for the spindle 48 being indicated by 51 and the one at the right front by 52 and the left rear 53 and the right rear 54. The spindle plugs 51 and 53 have fixed to their shafts 55 and 56 ratchet wheels 57 and 58 and these plugs 51 and 53 are mounted in housings composed of box castings 59 in connection with castings 60 the latter being fixed to the frame of the machine and furnishing the inside bearing on the spindle plugs 51 and 53.

The spindle plugs 52 and 54 are supported in castings 61 which are similar to the castings 60. The spindle plugs are not only revolved in their bearings as described, but are reciprocated longitudinally of their axis in order to engage the ends of the spindles or spools and this is brought about by flat springs 62, 63, 64 and 65 which are secured by rivets 66 to the plate frame members 34, but the movement in releasing the spindle plugs from the ends of the spindle 6 is brought about positively by cam blocks 67, 68, 69 and 70, the cam block 67 being secured to the spring 62, and 68 to the spring 64, and 69 to the spring 65 and 70 to the spring 63. Thus, as it were, the said cam blocks amount to integral parts of their respective springs. These cam blocks are narrower in width than are the springs to which they are attached and are acted upon by small flange rollers 71 the flanges of which embrace the tops and bottoms of the cam blocks while the middle or waste portions act on the cam surfaces direct.

The flange portions of these rollers operating directly against the outside of the plate frame pieces 34 thus on the movement of the rollers horizontally as shown in the plan view Fig. 15, Sheet 9, the flanges of the rollers take the thrust of the springs when the rollers travel up the camways and thus push or withdraw the spindle plugs 51, 52, 53 and 54 from within the ends of the spindles by pushing out the outer ends of the springs 62, 63, 64 and 65.

The rollers at the front of the machine or left of Fig. 15 are mounted on the downward turned ends 72 of rods 73. These rods 73 have their other ends turned outwardly at 74 and are hinged into lever arms 75 mounted on a cross rocker shaft 76 under the control of a hand lever 77. The cam rollers 71 at the rear which actuate the spindle plugs 53 and 54 are similarly mounted to those at the front of the machine but upon rods 78 which are likewise hinged at 79 to the aforementioned levers 75. Thus on the rocking of the levers 77 the rollers 71 are moved up the cams 67, 68, 69 and 70 and force outwardly the spindle plugs from the embrace of the ends of the spindles 48 and 49 and on their return movement the flat springs 62, 63, 64 and 65 throw the spindle plugs into engagement with the spindle 6. The spindle plugs and their equivalents are herein sometimes mentioned as spindle holding means.

In the use of the rolls of gelatin pad sheet moisture is required and I provide for moistening the gelatin pad as the same is unwound from the spindle 49 as it goes onto the impression bed and this moistening device consists of a roller 80 covered with felt or some absorbent material and mounted to revolve in water 81 in a box 82 which box swings up and down as required constantly to bring the roller 80 always in contact with the lessening diameter of the roller on the spindle 49 best shown by Fig. 3, Sheet 3.

This movement of the roller 80 and its water box 82 is brought about by the box being supported by angles 83 secured to the box 82 and these angles secured by bolts 84 to rocker shaft arms 85 the latter being fixed to a shaft 86 mounted in the plate frame members 34 and having secured thereto an arm 87 connected at 88 to springs 89, see Fig. 15, Sheet 9, and the latter connected at 90 to the cross frame member 40 of the side plate members 34.

Thus the springs 89 constantly hold the roller 80 in contact with the unwinding gelatin pad roll on the spindle 47 and constitutes an elastic means for keeping the roller in contact with the gelatin.

On the entry of a fresh spindle to the position 49 the moistening roller 80 must be retreated out of the way to permit the fresh spindle to enter and to thus bring about the movement downward out of the way of the roller 80 I connect the rocker shaft 86 to be revolved positively in one direction by the downward movement of the lever 77, see Figs. 3, 13 and 15, Sheets 3, 8 and 9 and this is provided for by a lever 91 secured at the right end of the shaft 86 carrying a pin 92 which is engaged by a lip 93 on the end of the lever 77. Thus when the handle of the lever 77 is pushed downward the water box and its roller 80 are likewise pushed or swung down clear of the spindle position 49, but on the return movement of the lever 77 the water box is free to move under the control of the springs 89 as described since the lip 93 acts on the pin 92 from the lower side only.

The mechanism that delivers a fresh roll out of the chuteway magazine at the rear of the machine, see Figs. 3 and 15, is composed of spider or spoked wheels 94 on a shaft 95 mounted on the plate frame members 34 and these spider or spoked wheels 94 are provided with spokes 96 arranged with curved surface connections 97 between the spokes conforming to the circle of the flanges 7 of the spindle 6.

Thus the flanges of the several spindles coming down the chuteway, see Fig. 3, automatically drop into one of the spaces between the spokes 96. Then as these spider wheels 94 revolve the space of one spoke carries a spindle and its roll out of the magazine into the position of the spindle 49, and likewise carries the empty spindle at position of the spindle 49 forward toward the front of the machine releasing it to roll on trackways 98 of a chuteway which direct the empty spindle to travel along underneath the bed by gravity from the position 49 to the position 48 at the front of the machine, the spindle or roll at the front having been removed by the operator and placed in the top of the S chuteway magazine at the position 32 of Fig. 1, thus allowing the empty spindle to ride into position of 48 whenever the handle 77 has been pushed down to release the spindle holding means or plugs 51, 52, 53, and 54, as above described from the ends of the spindle 6 and upon the arrival of the fresh spindle from the chuteway magazine to the position of 49 and the empty spindle to the position of 48 the handle 77 is lifted upward to its normal position allowing the spindle plugs to again enter to the ends of the spindles through the influence of their respective springs as above described.

The shaft 95 carrying the spider or spoked wheels 94 is held in position and revolved intermittently through the medium of a notched disc 99, see Figs. 1 and 13, which disc is held from accidental displacement by a braking clamp 100 composed of two plates 101 connected across by the bolts 102 and 103 and supported on a bracket 104 on the frame member 21. The friction of this braking clamp 100 is sufficient only to keep the shaft 95 stationary save only when it is moved by the operator which movement is brought about by the hand lever 105 the other end of which is hinged at 106 to a frame member 14 at the right of the machine and the lever 105 is hinged at 107 to a pawl member 108 held by a spring 109 in constant engagement with the periphery of the disc 99 on which there are a double series of notches or ratchet teeth, one set indicated by 110 serving only to be engaged by the pawl member 108 while the other set 111 being double faced are adapted not only to be engaged by the pawl member 108 but the other face of these notches 111 are adapted to be engaged by a pawl 112 hinged at 113, see Fig. 13, to the frame member 21 of the lower frame.

This pawl 112 is held in engagement with the ratchet teeth of the disc 99 by the weight of its outer end. Thus the purpose of the pawl 112 is to register or stop the movement of the shaft 95 to the exact position of one space between the spokes 96 of the wheels 94 thus always bringing about a registry of the spindle carried from the S or chuteway magazine to the right position of registry for the spindle 49 and hold it there until the lever 77 has been moved allowing the springs to actuate the spindle plugs to engagement with the ends of the spindles in positions 48 and 49 as above described.

The operator may release as desired the pawl 112 from engagement with the disc 99 through the means of a secondary lever 114 hinged at 115 to the frame member 21 and having an offset piece 116 carrying a stud 117 which engages the outer end 118 and the aforementioned pawl 112.

Thus when the operator desires to remove the spindle which has become empty at 49 and have that empty spindle transferred to the position 48 he moves down the lever 77, removes the full spindle at position 48 leaving that place blank and thus the empty spindle which is then at position 49 is free from its spindle plug. Then the operator disengages the pawl 112 from the disc 99 by means of the lever 114 and while the said lever is held holding the pawl 112 free from the disc 99 he moves the lever 105 through a position of two vibrations covering one step from one notch 110 to the next notch 110 thereby moving the spider or spoked wheels 94 a space of one spoke 96 which brings a fresh spindle from the chuteway magazine into the position 49 in the machine and frees the empty spindle to allow it to roll down track 98 of the track chuteway to front spindle position.

The double vibration of the lever 105 is made necessary in order to avoid too long a movement of the lever 105 since the amplitude of this movement at the front end of the machine would be too large for convenience if the whole distance was covered by one stroke of this lever which would mean one-fifth the circumference of the disc 99 since there are five spokes in the spider wheels 94.

Further, by making two operative movements of the lever 105 this allows only a shorter movement of the rolls in the S magazine at each interval for the large number of loaded spindles held in the S magazine thus lessening the impact of gravity of these falling spindles going down the chuteway and brought to rest at the completion of the interval of each movement down the chuteway.

After the lever 114 is held downward releasing the pawl 112 from one of its notches in the disc 99 this lever 114 may be released by the operator and the pawl 112 will automatically ride over the notches 110 and engage only the next notch 111 thus bringing about the stoppage of the further movement of the lever 105 on its arrival at the completion of the transfer of the spindle from the chuteway magazine to the position 49 of the machine.

The gelatin pad is drawn from the roll at spindle 49 to the spindle 48, see Figs. 2, 13, 15 and 21, through the medium of a hand wheel 119 provided with a handle 120 and this wheel is mounted on the shaft 55 of the spindle plug 51.

A dog 121 shown in Figs. 13 and 15 engages the ratchet 57 shown in dotted lines in Fig. 13 and thus holds the spindle from backward revolution as desired. A corresponding dog 122 shown in dotted lines in Fig. 13 acts on the ratchet 58 and holds it against backward movement and this dog 122 is released from engagement as desired through the medium of a rod 123, see Fig. 13, extending back to a hand lever 124 on the left of the machine hinged at 125 to the left plate frame member 34. The dog 121 is normally always in engagement with its ratchet 57 while on the other hand the dog 122 is intermittently engaged with its ratchet 58 at each interval of the drawing forward of the gelatin pad from position 49 to position 48.

However, occasions occur when it is desired to rewind back from the spindle 48 to the spindle 49 and when this occurs the dog 121 is held out of engagement by the operator with one hand while he operates with the other hand a crank 126, see Fig. 15, mounted on the shaft 56 of the spindle plug 53.

Thus by the mechanism hereinbefore described the gelatin pad roll may be drawn step by step in sections over the impression bed from the position of spindle 49 and wound onto the spindle at position 48 as each successive portion of it is used.

Then as the complete roll is wound upon the spindle at position 48 it is taken out and placed in the S magazine or the drum magazine as desired and a new spindle is taken from the S magazine and put into position of 49 as desired or if no spindle is desired out of the S magazine at this particular interval, a spindle may be taken from the drum magazine and placed vertically down into the position 49 the empty spindle being previously removed by hand from this position 49 and placed in front in position 48, thus allowing the shaft 95 with its spider wheel 94 to remain idle when such method of using the spindles is desired, allowing the S magazine to remain idle while the spindles are used out of the drum magazine as desired.

When it may be desired to hold the moistening roller 80 with its water box in retreat and out of place and as it were out of use this may be accomplished by means of the rod 127, see Figs. 15 and 21 which rod is connected at 128 with the lever 87 and at the other end provided with a hand hold knob 129 and collar 130 held in a keeper block 131 which permits the locking of the rod 127 by means of the collar 130 against the shoulder in the keeper block 131 when the knob 129 is withdrawn and the knob moved sidewise to produce the desired locking effect.

Thus far there has been described those parts of the machine covering the functions involved in handling the gelatin pad sheet rolls to and from the impression bed, that part of the gelatin pad on the impression bed being indicated by 47, and will now describe the impression carriage.

The impression carriage consists of a frame mounted on wheels and adapted to travel on the trackways 38 and move backward and forward lengthwise over the impression bed and carry an impression roll and a coacting clamping roll together with a paper guide, a paper stop and a paper guard in the function of impressing paper to and taking paper from the gelatin pad surface 47 on the impression bed and the principal member of this impression carriage is a rubber faced roller 132, see Figs. 3, 4, 6, 9, 10 and 16, Fig. 9 Sheet 6, and Fig. 10 Sheet 7, however, affording the clearest views, Fig. 9 being from the right side of the machine and Fig. 10 from the left side.

This impression roller 132 is moved upward and downward in the function of pressing paper to the gelatin pad sheet and it works in conjunction with a clamping roller 133 which moves to and from the impression roller 132 when the latter is close to or in contact with the gelatin sheet in the function of clamping the paper to the impression roller 132.

These rollers are mounted in the aforementioned impression carriage which is composed, as it were, of two different sections and these sections are hinged together, as it were, about the axis of the rear or larger wheels of the carriage. This feature will be observed by comparing Figs. 9 and 16 the latter figure showing the main part of the impression carriage lifted as relates to the secondary part of the carriage.

The main carriage is provided with a cross frame member of an inverted unbalanced V-type of sheet metal the main leg 134 of which is substantially at 45 degrees inclined to the impression bed in the position shown in Fig. 9, and this also forms the paper guide for the entrance of the paper to the position of registry in the copy work, the paper being indicated as 135. The other leg of the frame piece is indicated by 136 and forms the back wall of the cross frame piece. This cross frame member is connected at each end with an end plate member 137 for the right side and 138 for the left side. These end plate members 137 and 138 are connected across at the front with a Z-bar shaped section cross member 139.

The Z-bar cross member 139 is connected to the end plates 138 by means of little angle blocks 140 connected by screws and rivets to each of the members.

The rear or the main wheels 141 of the carriage are flanged wheels having double flanges 142, see Fig. 12 Sheet 7, which ride astride, as it were, of the top angle rails 38 and they are recessed at 143 in the middle of their treads to furnish clear space for small wires which extend along the top of the angles 38 and secured at the ends thereof and are wound around the tread portion of the wheels 141 and secured thereto in a manner to wind and unwind on the wheels 141 as the carriage is moved backward and forward over the impression bed. The purpose of this arrangement of the wires is to hold always the two wheels 141 perfectly square with the bed at any movement of their travel since these two wheels are fixed to the shaft 144 and thus both wheels must revolve at the same rate. The small wires are indicated by 145 and 146 there being a set of each of these wires on each side of the machine and as the wires at one end wind upon the wheels 141 those on the other end unwind from the wheels and the ends 147 of these sets are connected to the wheels by means of small radially aligned holes into which the ends of the wires are inserted and secured thereon by set screws 148, see Figs. 11 and 12, and each set of wires is wound around the wheels and unwound from thereon as the carriage is moved back and forth in the function of its travel over the impression bed. The outer ends of these wires are wound upon little windlasses 149, see Figs. 4 and 5, Sheet 4, which are provided with square ends 150 to permit their being wound with a wrench and these windlass blocks are mounted in bearings in clamping blocks 151 secured by screws 152 and 153 to the side angle rails 38 and the windlass blocks are clamped by means of the screws 154 clamping together the separated legs 155 of the bearing blocks 151. By this means the wires 145 and 146 may be adjusted forward and back as relates to the length of the bed to bring about an exactly square position of the shaft 144 with its wheels 141 with the impression bed and hold and guide the wheels in any part of the travel of the shaft backward and forward over the impression bed.

The shaft 144 is carried in bearing blocks 156, Fig. 9, Sheet 6, which blocks are hinged about hinge pin bolts 157 which are mounted in the V cross frame member and these blocks are adjusted about the hinge pin bolt 157 by a double set of screws one set 158 clamping the lower portion of the blocks 156 to the member 136 while the other set of screws 159 serve to adjust the lower ends of the blocks 156 away from the member 136.

By these two sets of screws 158 and 159 the cross frame member may be made to exactly align up in square relationship with the shaft 144 and thus through it to the impression bed.

The secondary frame portion of the impression carriage is composed of side rail pieces 160 for the right side and 161 for the left side each of these pieces being connected through the screws 162 to a bearing block end piece 163 provided with bearings 164 on the shaft 144. The main body of the side frame pieces 160 and 161 extend forward to the front of the carriage whereat there is secured the stud pins 165 on which are carried the double flanged small front wheels 166 the treads of which wheels are substantially the same as the treads of the rear wheels 141. The downward swing of the middle body of the frame pieces 160 and 161 between the front and rear wheels is to provide the location for the bearing pin or rollers 167, see igs. 4, 10 and 21, which enter underneath the horizontal flange 168 of the top side rail member 38 of the plate frame pieces 34 by which means the secondary frame holds the wheels 141 and 166 always down upon top side rail member 38 and prevents the displacement of the carriage from over the impression bed.

At the front of the machine the secondary frame members 160 and 161 extend upward in the projections 169 and on these projections there is provided the lower shoulder 170 and the upper shoulder 171 upon which shoulders there is supported the front end of the main part of the carriage by means of a spring clasp bar 172, see Fig. 2, which is provided with the turned over outer ends 173 which in connection with a little angle block 174 forms a clasp which embraces the upstanding projection 169 of the secondary frame pieces 160 and 161.

When the carriage is in use laying paper onto the gelatin pad and removing it therefrom, the spring clasp bar 172 rests on the shoulder 170 and thus supports the main portion of the carriage in its downward position onto the wheels 166 and the connection between the spring clasp bar 172 and the Z-bar cross frame member 139 being effected by the bolts 175 which pass through the upstanding leg 179 of the member 139 and also through the end 176 of the guideway plate 177 underneath the web of the Z-bar cross frame member 139, see Figs. 9 and 21.

Secondary nuts 178 separate the bar 172 from the upstanding flange or leg 179 of the Z-bar 139.

When a new gelatin pad is to be trained along the impression bed the front end of the carriage is lifted from the position of Figs. 4 and 9 to the position of Fig. 16, thus lifting the spring clasp bar 172 from off the shoulder 170 up onto the shoulder 171 and in this movement the ends 173 of the bar 172 follow up the straight edge 180 of the upstanding projection 169 of the secondary frame pieces 160 and 161 and as this is not a true arc from the shaft 144 the ends of the bar 172 spring outward until after the shoulder 171 is reached whereupon the ends swing inward resting on this shoulder 171 and holding the two sections of the carriage frame in position shown in Fig. 16, being the position which permits the threading through underneath the shaft 144 of the gelatin pad sheet over the impression bed.

On the completion of this operation and it is desired to replace the frame from position of Fig. 16 to that of Fig. 9 the central body portion at 181, of the bar 172, Fig. 2, is pressed inward by the fingers and this springs outward the ends 173 and releases them from the shoulder 171 and thus allows the main carriage frame to rock back onto the shoulders 170 as shown in Fig. 9.

The Z-bar cross frame member 139, see Fig. 9, Sheet 6, by means of its downward projecting leg 182 furnishes the paper stop or abutment block for the paper 135 as the same is entered into the impression carriage for registration at the commencement of the operation of the impression roller applying the paper to the gelatin pad surface 47; Fig. 9 the position of the parts are where the impression roller 132 is up and clear of the paper. Since this leg or flange 182 of the Z-bar frame member 139 does not come down directly in contact with the gelatin pad I provide a guard plate to prevent the end of the paper touching the gelatin pad 47. This guard plate is indicated by 183 and is called a paper guard which is a part of a Z-bar having the web 184 and the horizontal flange 185 this latter flange being embraced between the bars 177 and the web of the Z-bar member 139.

The bars 177 pass through apertures in the web 184 of the Z-bar paper guard plate and their right ends as seen in Fig. 9 are supported in notches or apertures in the lower flange or leg 182 of the Z-bar 139 and this paper guard plate 183 slides backward from the position shown in Figs. 6 and 9 to the position best observed in Fig. 10 wherein the guard end into which the paper 135 comes in contact with, is retreated to a position flush with the leg 182 of the Z-bar 139, this flush position being indicated by 186 in Fig. 16.

The paper guard portion of the Z-bar guard plate or that portion which is engaged by the paper, see Fig. 21, Sheet 11, is notched out at intervals and the flange 182 of the Z-bar 139 is correspondingly notched so that portions of the flange 182 extend into the spaces notched out of the guard plate, so that the end of the paper may not crowd in between these parts, and, as it were, shove past the paper stop being the flange or leg 182 which the paper is registered in position to be operated on.

Link motions are provided and connected up to move the guard plate back and forth to cause it to get out of the way of the impression roller 132 as the same descends upon the paper in the operation of pressing the paper down on the gelatin pad sheet 47 to a position shown in Figs. 3 and 10.

The impression roller 132 is provided with trunnions 187 journaled in the ends of arms 188 of a rocker shaft 189 in which there is provided the operating handle 190 by which the rocker shaft is vibrated backward and forward moving the impression roller 132 from its operative position in contact with the paper on the gelatin pad on the impression bed as shown in Fig. 10 to the clear position as shown in Figs. 6 and 9, the latter position being the position at which the paper is inserted and withdrawn from the impression carriage as relates to the impression roll itself to the carriage parts.

The Z-bar guard plate 183 is provided with trunnion blocks 191, see Figs. 9, 10 and 24, at each end which are connected to the web 184 of the guard plate and the trunnions 192 of the blocks 191 are connected to links 193 which links are hinged at 194 to arms 195 fixed on a rocker shaft 196 and at the left side of the carriage the arm 195 has an extension 197 upward, see Fig. 10, which carries a hinge pin 198 connected to a link 199 which extends to the front of the carriage and is provided with a notch 265 which engages a pin 200 on an arm 201, being a part of arm 188, which is fixed to the rocker shaft 189. Thus by the rocking of the rocker shaft 189 through the handle 190 the link motions just described move the guard plate 183 from position of Fig. 9 backward to the flush position previously mentioned as indicated by 186, the end then being flushed with the front face of the paper stop being the flange or leg 182 of the Z-bar frame piece 139.

In case it should be desired to operate the carriage without the use of the guard plate 183 and while the same is in retreated position as indicated by the flush edge 186 the link 199 is lifted by means of the handle portion 202 lifting the notch 265 free from the pin 200 and adjusting the link forward to bring a notch 203 of the link into engagement with a projection 204 which is fixed to the frame piece 138 and when the link 199 is thus so engaged by its notch 203 onto the projection 204 the guard plate Z-bar 183 is held stationary in its retreated position corresponding to its flush position 186.

This position of the parts is necessary when the machine is used with the secondary paper stop 262 shown in Fig. 24.

The clamping roller 133 is provided with trunnions 205 journaled in arms 206 which are hinged at 207 to the frame pieces 137 and 138 and thus the roller 133 swings about this hinge pin 207 from the position shown in Fig. 9 to the position shown in Fig. 10 the latter position being where the clamping roller 133 clamps the paper to the impression roller 132 and this clamping action is automatically brought about by springs 208, Fig. 9, located underneath the cross frame portion 134 and upon rods 209 which slide through apertures in brackets 210 secured to the undersurface of the frame piece 134.

The nuts 211 on threaded portions of the rods 209 serve for adjusting the tension of the springs 208 to force the rods 209 downward and the lower ends of these rods are secured into blocks 212 which are hinged at 213 into the arms 206 and thus the roller 133 is automatically held in the direction to engage the impression roller 132 when the latter is in contact with the paper on the gelatin pad.

The release of the clamping roller 133 from the impression roller 132, see Fig. 10, is brought about by links 214 hinged to pins 215 to the arms 206 and extending over to hinge pins 216 on lugs 217 of the arms 188 the latter being fixed to the shaft 189 as above described.

Thus by the rocking of the shaft 189 the springs 208 are permitted to force the clamping roller 133 to contact with the impression roller 132 and likewise to compress the springs 208 and free the roller 133 from the impression roller 132 being the variation in position of the parts by comparison of Figs. 9 and 10 which show the extremes of both cases.

In the movement of the impression carriage backward and forward over the impression bed in the performance of its work, I provide means for stopping the carriage at either end of its stroke and in order to take care of all classes of work these stops are adjustable at either end of the impression bed to permit the use of any section of the gelatin pad lying along the impression bed. The stop at the front where the paper is applied to the bed is called the impression carriage stop and the other stop is called the stroke stop.

These stops are supported on and clamped to, as desired, a bar 218, see Figs. 1, 4 and 13, fastened by screw bolts 219 at each end of the bed frame. The stroke stop at the rear of the machine is in the form of a lip 220 of a clasp 221 which embraces the bar 218 and is clamped to the bar by means of a mill headed clamp screw 222, see Fig. 14. The lip 220 comes in contact with the roller 167 on the right frame piece 160 of the secondary frame of the impression carriage.

By friction of the clamping screw 222 on the bar 218 the outward movement or stroke of the carriage may be limited as desired. The adjustable stop at the front end of the machine called the impression carriage stop is shown in section in Fig. 8, Sheet 5, and the contact piece is a projection 223 extending outward to the right side of the clasp block 224 which embraces the bar 218. The clamping action of this clasp block 224 on the bar 218 is brought about by a milled nut 225 on a screw threaded stud 226 which passes through the lower wings of the clasp block 224. This stop is engaged at intervals through the medium of its projection 223 by three members on the impression carriage, called engaging mechanism or means, all three of which are movable parts, see Fig. 6, and this is made necessary because of the peculiar movement of the impression carriage in rolling down the end of the sheet of paper first applied to the gelatin pad which rolling down movement is effected at the return stroke or movement of the impression carriage on the impression bed.

The position of the impression carriage in relation to the stop projection 223, or impression carriage stop, at the time the paper is inserted ready to be pressed down upon the gelatin pad is shown by Fig. 6 and in this figure the projection 223 is engaged on one side by the lower end 227 of a rocking lever 228 hinged at 229 to a block 230 secured to the frame member 137 and the lever 228 is provided with an arm 231 which is engaged by a little roller 232 on a pin in the arm 188 which carries the impression roller as above described. Thus when the operating handle 190 is at position of Fig. 6 in complete retreat the end 227 of the lever 228 is forced in engagement with the impression carriage stop projection 223.

In this position there is also brought about the engagement of the projection 223 by a shoulder 233 of a latch 234 hinged at 235 to the secondary carriage frame piece 160. This latch 234 is held in stable position in relation to the frame piece 160 by means of the slight spring of the latch itself over a small pin 236, see Fig. 7, in the frame piece 160 there being two small indentures 237 in the latch piece 234 adapted to engage the pin 236 in either the upper or lower position of the forward or left end of this latch 234 as shown in Fig. 6.

The movement of the latch 234 from the position shown in Fig. 6 wherein the shoulder 233 engages the projection 223 as compared with the position of this latch 234 as shown in Fig. 4 wherein the shoulder 233 would ride clear of the projection 223 is brought about in its upward movement by the inclined surface 238 passing over the projection 223 on the forward movement of the carriage; this taking place only when the handle 190 is in the position of Fig. 4.

The downward movement of the latch 234 with its shoulder 233 is brought about through the medium of a spring 239 secured by rivets 240 to a small block 241 secured by screws 242 to the latch 234 and the free end of this spring is engaged by a projection 243 on the lever block 244 fixed on the rocker shaft 189 and having a downward extending arm 245; the lower end of this is adapted to engage the stop projection 223 when the operating lever 190 is in its upward position as indicated by Fig. 6. Thus in Fig. 6 the position of the carriage along the impression bed is held against movement to the left or toward the front of the machine by the end 227 of the lever 228 and also by the shoulder 233 of the latch 234 and it is held against movement toward the rear of the machine or the right in Fig. 6, by the arm 245 thus positioning the carriage accurately when the paper is inserted to be registered on the gelatin pad. Then as the handle 190 is rocked from position of Fig. 6 to the operative position of laying down the paper on the gelatin pad as shown by Fig. 4 the downward projecting leg or arm 245 has been rocked free of the stop projection 223 which allows the carriage to move to the right toward the rear of the machine laying down the paper on the gelatin pad on the impression bed.

The latch 234 with its shoulder 233 holds the carriage from moving toward the front that is, in the direction of the operator during the movement of the operating handle in rocking forward to bring the impression roller down on the paper.

The view shown by Fig. 4 shows a position of the carriage moved to the right from that of the position of Fig. 6 a short distance and the parts of the carriage as shown in Fig. 4 will remain in the position of Fig. 4 during the outward and return stroke of the carriage in laying on and taking up the paper as relates to the gelatin pad sheet on the impression bed.

In the movement from the position of Fig. 6 to the position of Fig. 4 the inclined surface 238 of the latch 234 has ridden over the projection 223 and lifted the end of the latch 234 upward to the upper position of the latch registering into the lower of the holes 237 onto the pin 236 indicated in Fig. 7 and thus the latch is held upward always save only when the hand lever 190 rocks the shaft 189 to the position of Fig. 6 and this movement thus operates on the spring 239 as previously described and presses down this spring and when the carriage moves forward again as will be described later far enough to allow the notch or shoulder 233 to pass down over the projection 223 the spring 239 forces it down to the position of Fig. 6.

On the movement of the operating handle 190 from position of Fig. 6, to that of Fig. 4, a latch 246 having a catch shoulder 247 drops down over a pin 248 and thus locks the rocker shaft 189 in the position as shown in Fig. 4, so that the operator as he pushes the carriage forward and pulls it back may not displace the position of the parts until the full return movement of the carriage to the front of the machine after the impression is made.

Since the parts are in the position of Fig. 4 during this movement the latch 234 stays in position to ride over the projection 223 and thus there is nothing to arrest the movement of the carriage toward the front of the machine save only the end 22⁷ of the lever 228 and when this end 227 comes in contact with the projection 223 on the return movement of the carriage it yields and allows the carriage to continue to move until the carriage arrives at the position shown by Fig. 23 the lever 228 rocking about its pivotal center 229 and in this movement the projection 249 on this lever 228 engages the inclined surface 250 on the latch 246 and thus frees the latch from the pin 248, meantime the end 227 of the lever 228 has fallen backward and engaged the roll 167 on the frame piece 160, see Fig. 23, and thus limits the further movement of the carriage toward the front of the machine and in this movement of the carriage backward in relation to the impression bed from the point of depositing the paper thereon as indicated by Fig. 6 to the position of Fig. 23 causes the impression roll 132 and its clamping roll 133 to pull the sheet of paper entirely free from the gelatin pad.

The movement of the lever 228 about its axis and swinging from the position shown in Fig. 6 to position shown in Fig. 23 is resisted by a spring 251 secured to a block 252 connected to the portion 249 of the lever 228 and at the other end connected to the end of the bolt 157.

The return stroke of the carriage is, as it were, cushioned by spring 251 by the end 227 engaging the projection 223 and swinging about an arc which extends the spring 251 saving, as it were, an abrupt stop in the stopping of the carriage on its return movement.

The operator so manipulates the handle 190 that when the carriage has arrived at the position of Fig. 23, sheet 13, he rocks the handle from that position to position of Fig. 6 and in so doing allows the spring 251 acting through the lever 228 to move the carriage from its farthermost position at the front of the machine being the left in Fig. 23 to the position indicated by Fig. 6 thus bringing into engagement the embrace of the stop projection 223 by the projection 245, latch shoulder 233 and the end 227 of the lever 228 as indicated in Fig. 6.

Thus the movement in laying paper down on the gelatin pad sheet or impression bed and taking the same therefrom involves a location of the carriage on the impression bed as indicated by Fig. 6 whereat the paper is registered onto the gelatin pad.

Then the carriage is moved laying the paper down on the pad and then on the return movement the paper is withdrawn and the carriage is moved toward the front of the machine then and over the position of Fig. 6 where the paper was laid on and back farther to the position of Fig. 23 to where the paper has been pulled off the gelatin after the impression roller has passed entirely back over the paper and a little further besides thus pulling the paper entirely free from the gelatin pad.

Then as the operator lifts the impression roll 132 by rocking the handle 190 he automatically moves the carriage forward again with the assistance of spring 251 to the position of Fig. 6 which thus permits the latch 234 to drop down to position of Fig. 6 under the influence of the spring 239 again bringing the machine to a point of registry for a new operation.

The impression carriage stop projection 223 through the medium of the clamping of the milled nut 225 as above mentioned, may be adjusted forward and back along the bar 218 as desired in order to bring the registration of the paper onto the gelatin pad at any place on the impression bed. but for the greater part of the work involved in a machine of this class the position of this stop projection is desired as shown in Fig. 6 and in order to accommodate an easy placement of this stop I provide a registering pin 253 fixed into a flat steel spring 254 secured by screws 255 to the clasp portion 224 of the stop.

The other end of this spring 254 is formed into a hand hold 256, see Figs. 8 and 8ᴬ, sheet 5, which allows this end of the spring to be sprung outward and inward from the screws 255 as a center, thus carrying with it the pin 253 into and out of a hole provided in the bar 218 located to register the stop at the position indicated by Figs. 4 and 6.

However, when the machine is desired to be used without using the guard plate 183 as shown in Fig. 24 and the guard plate is put in position of retreat corresponding to what has heretofore been mentioned as position 186, the spring 254 is moved to disengage the pin 253 and permits the stop with its projection 223 to be moved nearer to the front of the machine to permit paper being passed down by the front of the gelatin pad sheet as relates to that portion which is on the incline passing down to the spindle and this incline portion being indicated by 257, see Fig. 25, in which case the operator registers the paper by the hand with which he has inserted the paper in place using the other hand to move the carriage as desired.

A secondary paper stop 262, Fig. 24, connected to arms 263 the latter hinged at 264 to frame permits the use of the carriage without using the stop 182 or guard plate 183. When stop 262 is not used it is revolved back to position in Fig. 25.

A side guide for the paper in being placed in registry of the machine is provided in the form of a plate 258 having the side flange 259 against which the paper is guided to lateral position. The plate 258 is held in position by the bent over portion 260 clamped to the cross frame by the clamping nut and bolt 261 which is supported in a slot in the frame portion 136 thus the lateral position of the paper being placed in the machine may be adjusted by moving the side paper guide backward and forward across the cross frame of the machine.

The constructions described permits a registration of the paper at any position on the gelatin pad sheet or impression bed and provides for what is termed an absolutely marginless impression at all times and provides for the carriage itself doing the lifting of the paper completely from the gelatin pad by means of the return movement going further back to the front of the machine than the position at which the paper is at first inserted and placed on the gelatin as described and further the arrangement of the parts as described, permits the paper to be shoved for a long distance through between the impression roll and clamping roll in order to copy only from an intermediate or top portion of a sheet of paper as compared with having always to copy from one end thereof which would be the case if it were not possible to retreat the paper guard 183 into the position of 186 as described, and this too in connection with the ability to move the stop with its projection 223 to accommodate the insertion of the paper in the carriage between the impression roll and the clamping roll with the carriage back far enough to clear that portion of the gelatin pad 257 on the incline as described.

The impression roll of the impression carriage or its equivalent constitutes means for holding and laying down the paper on the impression bed and the clamping roll that works in conjunction with the impressing roll or their equivalents constitute means for taking off the paper from the bed.

The operating handle, its rocker shaft and mechanisms connected to be moved therewith and their equivalents worked by moving the operating handle constitute the operating mechanism for the impression carriage.

In place of the wires 145 and 146 there may be substituted flat steel tapes, chains or nonstretchable cords or belts that will operate to the same end as the wires being the equivalents of the wires for the purpose used and I call these devices broadly "lines" a term used in cordage service.

The applicant has disclosed novel features in this application which are also disclosed in his co-pending applications Ser. Nos. 14,840; 18,326; 26,777; and 108,058; and expressly reserves the right to claim any novelty not covered by the claims of this application as allowed in another co-pending application.

What I claim is:

1. In a machine of the class described, an impression bed, an impression carriage mounted to travel backward and forward over the said bed and impress thereon sheets of paper, a paper stop for registering the paper on the impression bed and said stop carried by and moving with the carriage, a registering carriage stop adjustable in relation to the impression bed and adapted to register the impression carriage in a predetermined position in relation to the bed; mechanism mounted on the carriage adapted to engage the impression carriage stop and hold said carriage from movement in either direction in relation to the impression bed.

2. In a machine of the class described, an impression bed, in combination with an impression carriage adapted to move backward and forward over the bed and impress and remove paper therefrom, an impression carriage registering stop adapted to be adjusted to different classes of work in relation to the movement of the carriage on the bed and mechanism carried by the impression carriage for engaging the said impression carriage stop to limit the motion of the carriage in either direction.

3. In a machine of the class described, an impression bed and an impression carriage adapted to move to and fro over the said bed and impress paper thereon an impression carriage stop adjustable in relation to the length of the bed and adapted to be adjusted and fastened in different positions in relation to the bed; in combination with engaging means for the said impression carriage stop and carried by the impression carriage and said engaging means adapted to hold the carriage in relation to the stop and on the return movement of the carriage after an impression is made the said engaging means permitting the carriage to be moved over and beyond the registering position on the final removal of the paper from the impression bed.

4. In a machine of the class described, an impression bed, an impression carriage adapted to move to and fro over the bed and impress paper thereon an impression roll mounted in the carriage and adapted to move to and from the impression bed as relates to its position in the carriage, a rocker shaft adapted to move the impression roll to and from the impression carriage, an impression carriage stop secured to the impression bed, engaging means carried by the carriage and adapted to engage the impression carriage stop and register the impression carriage in relation thereto and said engaging means connected to be actuated through the movement of the said rocker shaft in positioning the said carriage for registration in relation to the impression bed and the impression stop.

5. In a machine of the class described, an impression bed, an impression carriage mounted to move to and fro over the bed and impress paper thereto, said impression carriage provided with an impression roll adapted to move up and down in its position in the carriage in relation to the impression bed and supported thereon by means of a rocker shaft and said rocker shaft moved by means of a handle for moving the impression roll to and from the impression bed in the function of placing paper thereon, a clamping roll adapted to clamp paper to the impression roll in the function of laying on and taking off the paper from the impression bed, a paper stop and paper guard carried by the impression carriage and adapted to be moved independently of said paper stop and to be withdrawn horizontally from beneath the paper simultaneously with the movement of the impression roll and clamping roll towards engagement with the paper.

6. In a machine of the class described, an impression bed, and an impression carriage adapted to move backward and forward over the bed, an impression roll carried by the impression carriage and adapted to be moved to and from the bed as relates to its position in the carriage, operating mechanism for moving the impression roll in its movement in the carriage, a longitudinally adjustable impression stop and engaging mechanism for engaging the impression stop and lifting said impression roll.

7. In a machine of the class described, an impression bed and an impression carriage adapted to move over the bed and impress paper thereon and remove it therefrom, an impression carriage stop adapted to be fixed in relation to the bed, engaging means carried by the carriage and adapted to engage the impression carriage stop and arrest the movement of the carriage in a retreated position where the paper is discharged and also hold the same in a different position whereat the paper is registered in relation to the bed.

8. In a machine of the class described, an impression bed and an impression carriage adapted to move to and fro over the said bed and impress paper thereon, an impression carriage stop and an impression roll carried by the carriage and mounted therein through the medium of a rocker shaft, engaging means moved by the said rocker shaft for engaging said stop to predetermined different positions of said carriage relative to said stop.

9. In a machine of the class described, an impression carriage moving to and fro over an impression bed, means for registering and holding in position the said carriage in relation to the said impression bed at different positions, one for registering the paper and the other for its final removal therefrom and the latter position being clear off from the copy surface used on the bed.

10. In a machine of the class described, an impression bed and an impression carriage adapted to move to and fro over the bed and impress paper thereon, means for holding and laying down the paper on the bed carried by the impression carriage, a paper registering stop carried by the impression carriage, a paper guard member adapted to be moved independently of and coacting with the said paper stop.

11. In a machine of the class described, an impression bed, and an impression carriage moving over the bed in the function of laying down and taking up the paper therefrom, a paper guide on the carriage for directing the paper to a paper stop, a paper stop carried by the carriage and held in a fixed position in the carriage, a paper guard mounted to coact with the paper stop and the paper guide to direct the paper to contact with the paper stop and prevent its accidental contact with the gelatin pad on the impression bed, said paper guard mounted to move horizontally underneath the paper and clear of the paper stop to permit the paper to be impressed down and below the paper guard; in combination with means for laying down the paper onto the impression bed and compressing the same down and below the paper stop to permit the movement of the stop over the paper after the paper is contacted with the gelatin pad on the bed.

12. In a machine of the class described, an impression bed, an impression carriage mounted to travel to and fro over the bed, a paper guideway as a part of the said carriage, an impression roll carried by the carriage and mounted to move thereon, a compression roll adapted to coact with the said impression roll and mounted in the carriage and adapted to move to and from the said impression roll, a paper stop fixed in the carriage and a paper guard coacting with the paper stop to direct the paper to register with the stop as the same is inserted in the carriage and adapted to move horizontally independently of said paper stop from underneath the paper and clear the passageway to permit the impression roll to push the paper down onto the impression bed in the field occupied by the paper before the carriage has been moved.

13. In a machine of the class described, an impression bed, an impression carriage mounted to travel to and fro over the bed in the function of laying paper down and taking it from the bed, an impression carriage stop for the purpose of locking the carriage in a stationary position and mounted to be fixed in relation to the bed, engaging means mounted on the carriage adapted to engage the impression carriage stop and said engaging means adapted to hold the carriage in a position of registration with the impression bed whereat the paper is first desired to be applied to the bed and for arresting the movement of the carriage on its return movement to a position clear of the paper location on the bed.

14. In a machine of the class described, an impression bed, an impression carriage mounted to travel to and fro over the bed in the function of laying paper down and taking it from the bed, an impression carriage stop for the purpose of locking the carriage in a stationary position and mounted to be fixed in relation to the bed, engaging means mounted on the carriage adapted to engage the impression carriage stop and said engaging means adapted to hold the carriage in a position of registration with the impression bed whereat the paper is first desired to be applied to the bed and for arresting the movement of the carriage on its return movement to a position clear of the paper location on the bed, and the said impression carriage stop adjustable along the travel of the carriage on the bed.

15. In a machine of the class described, an impression bed and an impression carriage mounted to travel to and fro over the bed an impression roll mounted to be moved in relation to the carriage in impressing paper onto the bed, mechanism carried by the carriage and adapted to impress and engage a carriage stop and lock the movement of the carriage in either direction; in combination with a carriage stop adapted to be fixed in desired locations in relation to the impression bed.

16. In a machine of the class described, an impression bed and an impression carriage movable in relation to the impression bed for the purpose of locating the position of the carriage on the bed at a place when the paper is first applied to the bed and also at a place when the paper is removed from the bed, mechanism composed of two swinging arms and a swinging latch carried by the carriage and adapted to engage the said impression carriage stop.

17. In a machine of the class described, an impression carriage having an impression roll that is movable up and downward in the carriage through the medium of a rocker shaft, lever arms connected to be moved by the rocker shaft and adapted to engage an impression carriage stop for the purpose of registering the impression carriage in a position on the bed; in combination with an impression bed and an impression carriage stop secured in position in relation to the bed.

18. In a machine of the class described, an impression bed, an impression carriage mounted to be moved backward and forward over the bed, a paper stop carried by the carriage and held in fixed relationship thereto, a paper guard located at the lower edge of the paper stop and adapted to coact therewith in registering the paper in the impression carriage, a rocker shaft forming part of the operating mechanism of the carriage and connected to move the said paper guard into and out of the path of the travel of the paper in passing to the paper stop.

19. In a machine of the class described, an impression bed, trackways associated with the bed one on each side thereof and adapted to support an impression carriage, an impression carriage mounted over the bed, a plurality of carriage supporting, circumferentially grooved wheels adapted to roll on the said trackways, a system of wires secured at the ends of the said trackways and the other ends of the wires secured to said wheels within said circumferential grooves with the wires from the different ends trained over the wheels in different directions in a manner that as the wheels roll backward and forward over the bed one set of wires is wound up as the other set of wires is unwound and the wires on each end of the impression carriage and sides of the impression bed adjusted to hold the impression carriage squarely with the bed in all positions of its travel in relation to the bed.

20. In a machine of the class described, an impression bed, a trackway associated with the bed on each side thereof an impression carriage mounted to be carried over the bed, grooved wheels riding on the said trackways, lines secured at each end of the bed and extending along each of the trackways and wound upon said wheels and within the grooves whereby as the carriage moves one set of the lines is wound up and the other set is unwound and means for adjusting the lengths of these lines for assistance is adjusting the carriage squarely with the bed.

21. In a machine of the class described, an impression bed, ways on each side of the bed adapted to support a movable impression carriage, an impression carriage provided with grooved wheels adapted to ride on the said ways, means for holding the said wheels squarely in their travel over the bed and means for adjusting the said impression carriage frame in relation to the axle of the wheels.

22. In a machine of the class described, an impression carriage provided with wheels adapted to support the carriage on trackways associated with the bed and the said carriage having a main frame and a secondary frame one set of these wheels associated directly with the main frame and the other set with the end of the secondary frame and the two frames hinged together and the said secondary frame riding constantly in the same association to the trackways while the main frame may be rocked upwardly to provide clearance over the impression bed and means for locking the main frame in the said upward position; in combination with an impression bed and trackways associated therewith upon which the said impression carriage is supported.

23. In a machine of the class described, an impression bed and an impression carriage adapted to be moved to and fro over the bed and mounted upon wheels the said wheels running on a trackway associated with the bed and said impression carriage provided with a main frame and a secondary frame and the two frames hinged in a manner that one of their ends may be raised and lowered in relation to the other for clearance purposes as relates to the bed and the main frame of the said carriage carrying a paper guide, a paper stop, a paper guard, an impression roll and a compression roll, together with the operating means for these parts.

24. In a machine of the class described, an impression bed and an impression carriage located to travel backward and forward over the bed, an impression carriage stop associated with the bed for the purpose of locating resting positions of the carriage in relation to the bed, engaging means for the impression carriage stop adapted to register the carriage in a position whereat the paper is first applied to the impression bed and said engaging means permitting the carriage on the return stroke to return back over and beyond the aforesaid registering position and then move forward to the said registering position the last mentioned movement being accomplished as the operating handle is moved to release the paper from the carriage.

25. In a machine of the class described, an impression bed and an impression carriage adapted to move to and fro over the bed, a paper stop carried by the impression carriage, a paper guard cooperating with the said paper stop for registering the paper in relation to the carriage itself the said paper guard movable and adapted to be adjusted and held out of operating position to allow a free passage of the paper down past the paper stop on the carriage, a secondary paper stop located at the end of the impression bed and adapted to be used as a paper stop in place of the paper stop on the carriage when desired along with the impression carriage located to accommodate the position of the carriage to the said secondary paper stop.

26. In a machine of the class described, an impression carriage carrying an impression roll the said roll mounted in the said carriage through the medium of a rocker shaft, a lever hinged to the said carriage one arm of which being adapted to engage an impression carriage stop and provided with a secondary arm adapted to be engaged and moved by the movement of the said rocker shaft; in combination with an impression bed over which the said carriage is mounted and an impression carriage stop located in relation to the bed.

27. In a machine of the class described, an impression bed, spindle holding means located at each end of the said bed, spindles for carrying gelatin pad rolls wound thereon and said spindles having notched ends adapted to be engaged by the said spindle holding means and said spindle holding means composed of plugs having projections adapted to engage the notches in the said spindle ends and the said plugs mounted to be moved lengthwise of their axis in a direction to enter and retreat from the ends of the spindles of the said roll, cam movements for moving the said plugs lengthwise of their axis and the said cam movements connected to be operated by a rocker shaft and the said rocker shaft controlled in its movement by an operating handle.

28. In a machine of the class described, an impression bed with spindle holding means at each end of the bed for holding spindles upon which are wound the gelatin pad sheets in the form of rolls, spindles holding gelatin pad sheets in the form of rolls and provided with flanges on the end thereof adapted to roll on trackways in chutes, a trackway chute extending underneath the impression bed and inclined from the spindle holding means at one end of the bed being the end from which the roll is unwound and extending to the front end of the bed to the position of the winding spindle and adapted to carry a spindle from one spindle position to the other.

29. In a machine of the class described, an impression bed, spindle holding means located at each end and below the surface of the said bed, a chuteway extending between the spindle holding means and adapted to guide and carry a roll spindle from one spindle position to the other.

30. In a machine of the class described, an impression bed, adapted to support a gelatin pad sheet strip, a spindle upon which the said gelatin pad sheet strip is wound in the form of a roll and said spindle provided with flanges thereon adapted to roll on a trackway in a chute, a trackway chute extending underneath the bed and adapted to carry the said spindles by rolling travel along underneath the bed.

31. In a machine of the class described, an impression bed adapted to support a gelatin pad sheet strip, a spindle upon which the said gelatin is wound in the form of a roll and said spindle provided with flanges on its ends adapted to carry the spindle along a trackway in a chuteway, a magazine chuteway extending upward from one end of the bed and adapted to hold a surplus stock of gelatin rolls wound upon the said spindles and deliver the same downwardly as the said loaded spindles travel down the chuteway by gravity, spindle holding means at one end of the said chuteway; in combination with means for taking a loaded spindle from the delivery end of the magazine chuteway and placing it into the spindle holding means at the end of the bed.

32. In a machine of the class described, an impression bed adapted to hold and support a gelatin pad sheet strip as the same is unwound from a roll of said strip carried upon a spindle, spindle holding means at one end of the bed adapted to hold a loaded roll of the gelatin pad sheet strip and deliver the same by unwinding the strip from the said roll, flanges on the ends of the said spindle adapted to support the same in a chuteway, a magazine chuteway for holding surplus spindles located in the vicinity of the end of the bed and adapted to deliver by gravity acting upon the loaded spindles to cause them to travel down the chuteway to a position to be delivered to the spindle holding means at the end of the bed, spoked wheels for engaging the flanges of the spindle held in the magazine chuteway and moving the same over to the spindle holding means at the end of the said impression bed.

33. In a machine of the class described, an impression bed provided with spindle holding means at the end of the bed adapted to hold a spindle upon which is wound a gelatin pad sheet strip and allow the same to be unwound and delivered upon the said impression bed, means for discharging an empty spindle from the spindle holding means at the end of the bed and simultaneously delivering a fresh spindle taken from the delivery end of the said magazine chuteway and place it in the position of the spindle holding means.

34. In a machine of the class described, an impression bed, spindle holding means for gelatin rolls located at one end of the bed from which a gelatin roll is adapted to be unwound and trained over the bed, spindles carrying gelatin pad sheet strips wound thereon in the form of rolls and said spindles provided with flanges adapted to act as wheels in supporting the spindles in trackways in a chute, a magazine chuteway for the spindles located above the bed and adapted to hold a surplus stock of spindles and discharge the same down the chuteway by gravity and means for taking from the chuteway in succession the said spindle rolls and delivering them to the spindle holding means in relation to the bed.

35. In a machine of the class described, spindle holding means composed of plugs adapted to enter and engage the ends of spindles upon which are carried gelatin pad rolls, and said plugs mounted on short shafts adapted to be moved endwise in the engagement and disengagement of the spindles the movement of the plugs in the direction of engagement with the spindles being produced by a spring action and the reverse action produced by positive acting mechanism, one set of these plugs at each end of the machine and the said positive acting mechanism in part composed of a rocker shaft having arms connected to the said positive acting mechanism and with a hand lever arm in reach of the operator by which said positive acting mechanism is actuated.

36. In a machine of the class described, an impression bed having located at each end thereof spindle carrying means adapted to hold spindles upon which gelatin pad sheets are wound in the form of rolls and allow the rolls to be wound and unwound in the service of the gelatin pad sheet over the said impression bed and positive means for releasing the said spindle holding means from the said spindles, a moistening device for supplying moisture to the surface of the gelatin pad sheet mounted to rise and fall in contact with the gelatin pad roll held on the spindle from which the pad is unwound, elastic means for holding the moistening device in contact with the gelatin pad sheet and positive means for retreating the same and said positive means connected to be operated simultaneously with the release of the said spindle holding means.

37. In a machine of the class described, an impression bed, spindle holding means at each end of the bed adapted to hold gelatin pad rolls, said spindle holding means actuated to engage the gelatin pad roll carrying spindles by springs and actuated on the release by cam surfaces and cam rollers and the said cam rollers connected by links to be moved by a rocker shaft.

38. In a machine of the class described, a moistening device mounted upon arms upon a rocker shaft and adapted to swing up and down in contact with the gelatin surface of a gelatin pad roll carried in the machine, a spring mounted to hold the moistening device in contact with the gelatin pad roll and a secondary rocker shaft connected to move the first mentioned rocker shaft to depress the said moistening device free from the gelatin pad roll.

39. In a machine of the class described, an impression bed, spindle holding means at each end of the bed and located beneath the top surface thereof a chuteway extending from one spindle holding means at one end of the bed forward to the other spindle holding means at the other end of the bed and adapted to support and direct the travel of the spindle from one spindle holding position to the other, a magazine chuteway for holding a surplus stock of gelatin pad rolls on spindles and the said magazine chuteway adapted to deliver loaded spindles in position to one end of the machine, a shaft upon which there are spoked wheels having spaces between the spokes adapted to receive the ends of spindles upon which gelatin pad rolls are mounted and the said shaft with its spoked wheels located in association with the spindle holding means at one end of the said bed in a manner that as the shaft is revolved from spoke to spoke a loaded spindle is carried from the magazine chuteway to the spindle holding means, a ratchet wheel mounted on the said shaft and provided with two sets of pawls and a hand lever for operating the said ratchet and spoked wheel by a step by step motion in the function of transferring a loaded spindle out of the said magazine chuteway into position of the spindle holding means.

40. In a machine of the class described, a spindle moving mechanism having a shaft upon which are mounted spoked wheels adapted to carry a spindle of gelatin pad roll from one position to another, a ratchet disc mounted on the said shaft and by means of which the said shaft is intermittently revolved and said ratchet disc provided with a clamping brake device adapted to prevent accidental movement.

41. In a machine of the class described, a spindle moving mechanism having a shaft upon which are mounted spoked wheels adapted to carry a spindle of gelatin pad roll from one position to another, a ratchet disc mounted on the said shaft and by means of which the said shaft is intermittently revolved and said ratchet disc provided with a clamping brake device adapted to prevent accidental movement, together with a double set of ratchet teeth one set being opposed in direction to the other and two pawls one used in moving the disc and the other as a stop for registering a position of travel and exact location for receiving and discharging a spindle to and from the spoked wheels.

42. In a machine of the class described, the combination with an impression bed, of a trackway on each side of said bed, an impression carriage provided with a frame section mounted on said trackways and a main section pivotally mounted on said frame section and adapted to be swung upwardly clear of said bed, said carriage being mounted on wheels engaging said trackways, said carriage closely approximating the surface of said trackways.

43. In a machine of the class described, an impression carriage provided with an impression roller mounted to be raised and lowered, a clamping roller adapted to coact with said impression roller in holding a sheet on an impression bed, means for yieldingly holding said clamping roller in contact with said impression roller, and trip controlled means for raising said impression roller from a sheet on said impression bed upon the return to the starting position and for lowering said impression roller to the initial position upon the return of said carriage to its starting position.

44. A hectograph duplicating machine comprising a movable carriage, a frame pivotally mounted on said carriage, an impression bed, said carriage being mounted on wheels at each edge of said impression bed and closely approximating the surface thereof, a yoke pivotally mounted in said frame, and a rotatable platen carried by said yoke.

45. In a machine of the class described, an impression bed, an impression carriage mounted to travel over said bed, an impression roller mounted on said impression carriage and adapted to be raised and lowered in relation to said bed, a compression roller adapted to clamp paper to said impression roller, and means for retreating said compression roller away from the path of travel in the upward and downward movement of said impression roller, said retreating means being operatively connected to the operating means for raising and lowering said impression roller.

46. In a machine of the class described, an impression bed, an impression carriage mounted to travel over said bed, an impression roller mounted on said impression carriage and adapted to be raised and lowered in relation to said bed, a compression roller adapted to clamp paper to said impression roller, and means for retreating said compression roller away from the path of travel in the upward and downward movement of said impression roller, said retreating means being operatively connected to the operating means for raising and lowering said impression roller, with spring operated mechanism for operating the said compression roller to contact with said impression roller.

Signed at Chicago, in the county of Cook and State of Illinois, this 4th day of September, 1925.

WILLIAM ERASTUS WILLIAMS.